United States Patent
Usui

(10) Patent No.: US 10,979,612 B2
(45) Date of Patent: Apr. 13, 2021

(54) ELECTRONIC DEVICE COMPRISING PLURALITY OF CAMERAS USING ROLLING SHUTTER MODE

(71) Applicant: Samsung Electronics Co., Ltd., Gyeonggi-do (KR)

(72) Inventor: Takafumi Usui, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/647,922

(22) PCT Filed: Sep. 4, 2018

(86) PCT No.: PCT/KR2018/010284
§ 371 (c)(1),
(2) Date: Mar. 17, 2020

(87) PCT Pub. No.: WO2019/059562
PCT Pub. Date: Mar. 28, 2019

(65) Prior Publication Data
US 2020/0267296 A1 Aug. 20, 2020

(30) Foreign Application Priority Data
Sep. 20, 2017 (KR) .......................... 10-2017-0121137

(51) Int. Cl.
*H04N 5/225* (2006.01)
*H04N 5/235* (2006.01)
(Continued)

(52) U.S. Cl.
CPC ......... *H04N 5/2258* (2013.01); *H04N 5/2353* (2013.01); *H04N 5/378* (2013.01); *H04N 5/3745* (2013.01)

(58) Field of Classification Search
CPC .... H04N 5/2258; H04N 5/378; H04N 5/2353; H04N 5/3745; H04N 5/262; H04N 5/3532; H04N 5/23216; H04N 5/23287
(Continued)

(56) References Cited

U.S. PATENT DOCUMENTS 8,717,422 B2 * 5/2014 Hewes ................. H04N 13/239
348/47
8,803,990 B2 * 8/2014 Smith .................. H04N 5/3532
348/218.1
(Continued)

FOREIGN PATENT DOCUMENTS

JP 2016-99598 A 5/2016
JP 2017-17448 A 1/2017
(Continued)

*Primary Examiner* — Pritham D Prabhakher
(74) *Attorney, Agent, or Firm* — Cha & Reiter, LLC.

(57) ABSTRACT

An electronic device is provided. The electronic device includes a first camera configured to include a first image sensor, a second camera configured to include a second image sensor, and a processor. The processor allows a pixel array of the first image sensor to have a difference of a first exposure start timing in units of at least one row and obtains a first image based on a first exposure period and a first read-out speed using the first camera, allows a pixel array of the second image sensor to have a difference of a second exposure start timing in units of at least one row and obtains a plurality of second images based on a second exposure period and a second read-out speed using the second camera, and generates a third image by synthesizing at least some of the plurality of second images.

15 Claims, 14 Drawing Sheets

(51) Int. Cl.
*H04N 5/3745* (2011.01)
*H04N 5/378* (2011.01)

(58) Field of Classification Search
USPC ...................................................... 348/222.1
See application file for complete search history.

(56) References Cited

U.S. PATENT DOCUMENTS

| | | | |
|---|---|---|---|
| 9,185,291 B1 | 11/2015 | Shabtay et al. | |
| 9,389,409 B2* | 7/2016 | Xia ...................... | G02B 21/367 |
| 9,661,233 B2 | 5/2017 | Shabtay et al. | |
| 9,894,287 B2* | 2/2018 | Qian ...................... | H04N 5/247 |
| 9,948,833 B2 | 4/2018 | Kim et al. | |
| 10,015,408 B2 | 7/2018 | Shabtay et al. | |
| 10,225,479 B2 | 3/2019 | Shabtay et al. | |
| 10,250,842 B2* | 4/2019 | Park ................... | H04N 5/23238 |
| 10,290,111 B2* | 5/2019 | Jia .............................. | G06T 7/33 |
| 10,326,942 B2 | 6/2019 | Shabtay et al. | |
| 10,484,600 B2* | 11/2019 | Baek .................... | H04N 5/2258 |
| 10,750,933 B2* | 8/2020 | Blanquart .......... | A61B 1/00018 |
| 2008/0024614 A1* | 1/2008 | Li ........................ | H04N 13/296 348/207.99 |
| 2012/0074227 A1* | 3/2012 | Ferren ................. | G06F 3/04842 235/462.21 |
| 2012/0188392 A1* | 7/2012 | Smith .................. | H04N 5/2355 348/222.1 |
| 2015/0161798 A1* | 6/2015 | Venkataraman ..... | H04N 13/271 348/47 |
| 2016/0037045 A1* | 2/2016 | Jannard .................. | G06T 5/007 348/226.1 |
| 2016/0050374 A1 | 2/2016 | Shabtay et al. | |
| 2016/0301840 A1* | 10/2016 | Du ........................ | H04N 5/265 |
| 2016/0352996 A1* | 12/2016 | Qian ....................... | G06T 5/007 |
| 2017/0019616 A1* | 1/2017 | Zhu ........................ | G06T 5/002 |
| 2017/0187928 A1 | 6/2017 | Kim et al. | |
| 2017/0187981 A1* | 6/2017 | Park ..................... | H04N 5/2258 |
| 2018/0174270 A1* | 6/2018 | Burgess ................... | G06T 7/70 |
| 2019/0020802 A1* | 1/2019 | Melkote Krishnaprasad ............. G06T 5/50 |  |

FOREIGN PATENT DOCUMENTS

| | | |
|---|---|---|
| JP | 2017-103582 A | 6/2017 |
| KR | 10-2016-0143138 A | 12/2016 |
| KR | 10-2017-0055865 A | 5/2017 |
| KR | 10-2017-0076398 A | 7/2017 |

* cited by examiner

ELECTRONIC DEVICE COMPRISING PLURALITY OF CAMERAS USING ROLLING SHUTTER MODE

CROSS REFERENCE TO RELATED APPLICATIONS

This application is a National Phase Entry of PCT International Application No. PCT/KR2018/010284, which was filed on Sep. 4, 2018, and claims a priority to Korean Patent Application No. 10-2017-0121137, which was filed on Sep. 20, 2017, the contents of which are incorporated herein by reference.

TECHNICAL FIELD

The present disclosure relates to technologies of an electronic device including a plurality of cameras, each of which uses a rolling shutter mode.

BACKGROUND ART

An image sensor of a digital camera using a rolling shutter mode may have a pixel array arranged in a two-dimensional (2D) matrix. The rolling shutter mode may be a mode of performing an exposure and read-out in order from a top row of the pixel array to a bottom row thereof. Thus, there may be a difference between exposure start and end times for each row of the pixel array.

Meanwhile, an electronic device including a plurality of cameras may obtain a plurality of images in which the same subject is captured using the plurality of cameras and may synthesize the obtained images into one image.

The above information is presented as background information only to assist with an understanding of the present disclosure. No determination has been made, and no assertion is made, as to whether any of the above might be applicable as prior art with regard to the present disclosure.

DISCLOSURE

Technical Problem

A plurality of cameras included in an electronic device may have different read-out speeds. When read-out speeds are different from each other, there may be a difference between exposure start timings and a difference between exposure end timings for each row of pixel arrays of image sensors of different cameras in a rolling shutter mode. In other words, exposure periods may be changed for each row of the pixel arrays of the image sensors of the different cameras.

To synthesize images obtained from the different cameras, exposure start timings and exposure end timings of each row of pixel arrays respectively configuring the image sensors of the different cameras should approximate or the same as each other. The same exposure timing (the same exposure start timing and the same exposure end timing) may mean that a region is exposed at the same time.

Furthermore, different cameras may obtain images for the same subject, respectively. To synthesize the images obtained from the different cameras, exposure timings of image sensors of the cameras should be the same as each other with respect to an overlaid region of the images (a region where the same portion of the subject is captured).

When read-out speeds per angle of view in a vertical direction of a plurality of cameras are the same as each other, exposure start timings of images obtained from the cameras may be identical to each other. Thus, if exposure timings for the overlaid region of the images are the same as each other, it is able to synthesize the images.

However, it is difficult to apply all of image sensors having the same read-out speed per angle of view in a vertical direction to the plurality of cameras included in the electronic device. For example, since a high- or low-speed image sensor should be used depending on an area of an angle of view of a lens, the freedom of design may deteriorate.

Technical Solution

Aspects of the present disclosure are to address at least the above-mentioned problems and/or disadvantages and to provide at least the advantages described below. Accordingly, an aspect of the present disclosure is to provide an electronic device for obtaining images, having a difference between exposure start timings, in which exposure timings are substantially the same as each other, from cameras, which operate in a rolling shutter mode, with different read-out speeds per angle of view in a vertical direction.

In accordance with an aspect of the present disclosure, an electronic device is provided. The electronic device may include a first camera configured to include a first image sensor and sequentially perform an exposure and read-out in units of at least one row of a pixel array of the first image sensor, a second camera configured to include a second image sensor and sequentially perform an exposure and read-out in units of at least one row of a pixel array of the second image sensor, and a processor. The processor may be configured to allow the pixel array of the first image sensor to have a difference of a first exposure start timing in units of the at least one row and obtain a first image based on a first exposure period and a first read-out speed using the first camera, allow the pixel array of the second image sensor to have a difference of a second exposure start timing in units of the at least one row and obtain a plurality of second images based on a second exposure period including at least a portion of the first exposure period and a second read-out speed using the second camera, and generate a third image by synthesizing at least some of the plurality of second images. The third image may have a region corresponding to the first image, the region having an exposure period approximating the first exposure period of the first image.

In accordance with another aspect of the present disclosure, an electronic device is provided. The electronic device may include a first camera configured to perform read-out at a first read-out speed, a second camera configured to perform read-out at a second read-out speed, and a processor. The processor may be configured to receive a signal in which an external object is captured, obtain a first image corresponding to a first exposure period for the external object, based on a first exposure time using the first camera, in response to the signal, obtain a plurality of second images corresponding to a second exposure period including at least a portion of the first exposure period with respect to the external object, based on a second exposure time using the second camera, divide the first image into a plurality of regions including a first region corresponding to a first period included in the first exposure period and a second region corresponding to a second period which is included in the first exposure period and is different from the first period, and generate a third image in which the first image and at least some of the plurality of second images are synthesized, at least using a third region corresponding to the first period and corresponding to the first region among some regions of the plurality of second images and a fourth region corresponding to the second period and corresponding to the second region among the some regions of the plurality of second images.

Advantageous Effects

According to embodiments disclosed in the present disclosure, since a plurality of cameras with different read-out speeds per angle of view in a vertical direction are loaded into the electronic device, the freedom of design may be increased.

According to embodiments disclosed in the present disclosure, the electronic device may easily synthesize images obtained from a plurality of cameras with different read-out speeds per angle of view in a vertical direction, included in the electronic device.

Various effects ascertained directly or indirectly through the present disclosure may be provided.

Other aspects, advantages, and salient features of the disclosure will become apparent to those skilled in the art from the following detailed description, which, taken in conjunction with the annexed drawings, discloses various embodiments of the present disclosure.

DESCRIPTION OF DRAWINGS

The above and other aspects, features, and advantages of certain embodiments of the present disclosure will be more apparent from the following description taken in conjunction with the accompanying drawings, in which.

MODE FOR INVENTION

Figure 1:
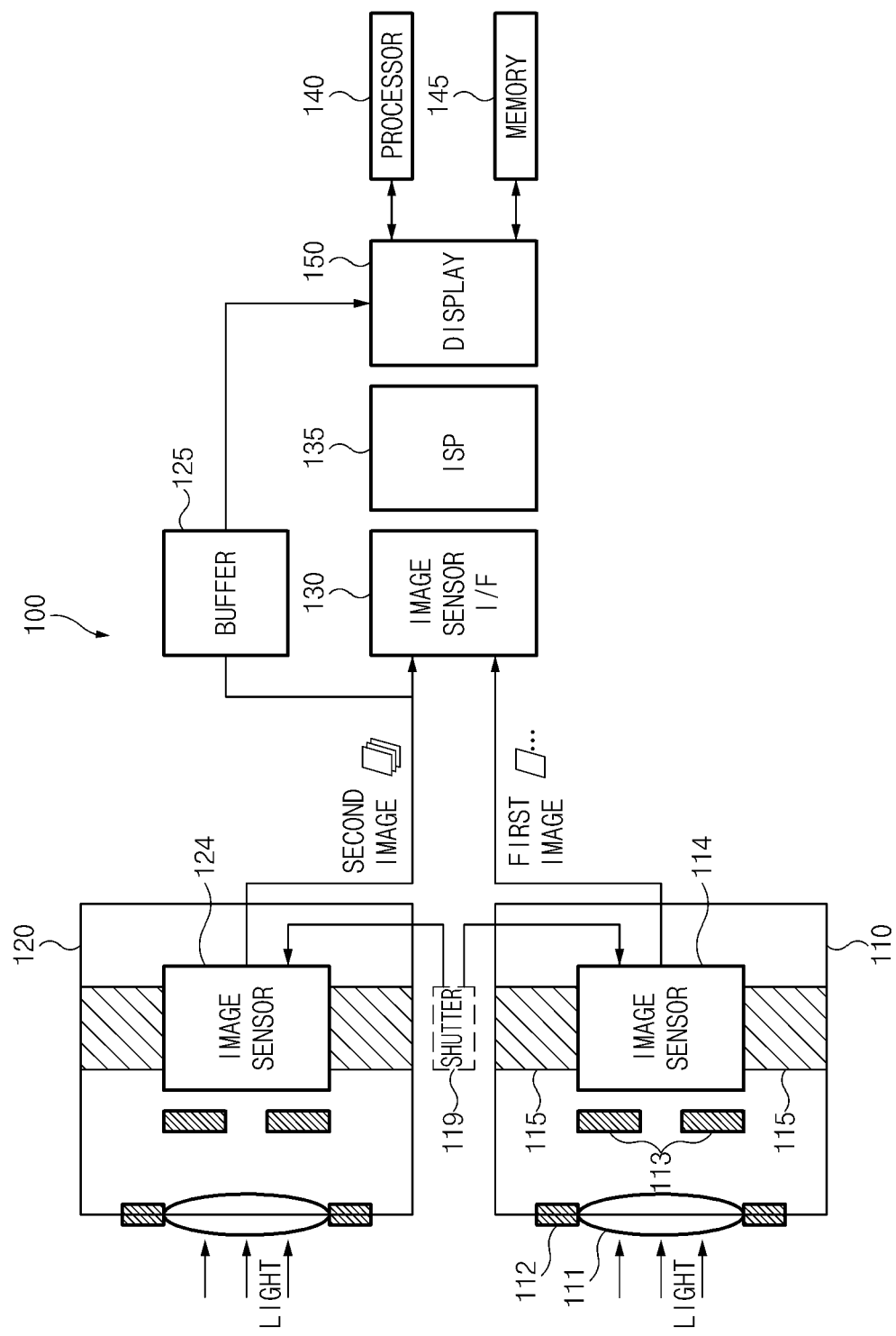
FIG. 1 is a block diagram illustrating a configuration of an electronic device according to an embodiment.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the present disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the present disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the present disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the present disclosure, a first component may be referred to as a second component, and similarly, a second component may be referred to as a first component.

It will be understood that when a component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there are no intervening component (e.g., a third component).

According to the situation, the expression "configured to" used in the present disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the present disclosure. In some cases, even if terms are terms which are defined in the present disclosure, they may not be interpreted to exclude embodiments of the present disclosure.

An electronic device according to various embodiments of the present disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or Play Station™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the present disclosure may not be limited to the above-described electronic devices and may include other electronic devices and new electronic devices according to the development of technologies.

Hereinafter, electronic devices according to various embodiments will be described with reference to the accompanying drawings. In the present disclosure, the term "user" may refer to a person who uses an electronic device or may refer to a device (e.g., an artificial intelligence electronic device) that uses the electronic device.

FIG. 1 is a block diagram illustrating a configuration of an electronic device according to an embodiment.

Referring to FIG. 1, an electronic device 100 according an embodiment may include a first camera 110, a second camera 120, a buffer 125, an image sensor interface (I/F) 130, an image signal processor (ISP) 135, a display 140, a memory 145, and a processor 150. In FIG. 1, an embodiment is exemplified as the electronic device 100 includes the two cameras 110 and 120. However, embodiments are not limited thereto. For example, the electronic device 100 may include three or more cameras.

The first camera 110 may include a lens 111, optical image stabilization (OIS) driving modules 112 and 115, an aperture 113, an image sensor 114, and a shutter 119. According to various embodiments, the first camera 110 may be implemented to fail to include some components or further include other components which are not shown in FIG. 1. Since the second camera 120 includes the same configuration as the first camera 110, a duplicated description of the second camera 120 may be replaced with the description of the first camera 110.

The lens 111 may condense light incident from the outside to the first camera 110. The condensed light may arrive at the first image sensor 114 through the aperture 113. In other words, the lens 111 may allow light reflected from a subject or light generated from the subject to reach a pixel array of the first image sensor 114.

The aperture 113 may adjust an amount of light which reaches the first image sensor 114. In general, the greater an aperture value, the more the amount of light which reaches the image sensor 114 may be decreased. The smaller the aperture value, the more the amount of light which reaches the image sensor 114 may be increased.

The first image sensor 114 may include a pixel array in which a plurality of pixels are arranged in 2 dimensions in a grid shape. Millions to tens of millions of pixels may be included in the pixel array, and one of a plurality of theme colors may be assigned to each of the pixels. For example, the plurality of theme colors may include "RGB (red, green, blue)" or "RGBW (red, green, blue, white)". The image sensor 114 may be implemented using, for example, a charge-coupled device (CCD) or a complementary metal-oxide-semiconductor (CMOS).

According to an embodiment, the first image sensor 114 may generate an electrical signal based on light received from the outside and may generate digital image data (e.g., Bayer image data) based on the electrical signal.

According to an embodiment, the first camera 110 may operate in a rolling shutter mode. For example, the first camera 110 may sequentially perform an exposure and read-out in units of at least one row of the pixel array using the first image sensor 114.

According to an embodiment, the first image sensor 114 of the first camera 110 may obtain first image data (hereinafter simply referred to as "first image") of a subject. A second image sensor 124 of the second camera 120 may obtain second image data (hereinafter simply referred to as "second image") having a time difference with the first image of the subject.

According to an embodiment, the second image sensor 124 may obtain a plurality of second image data in a single exposure period. The plurality of second image data may be temporarily stored in the buffer 125.

Meanwhile, the "exposure period" may be referred to as a period where an exposure is performed for one entire screen. For example, the exposure period may be referred to as a period from an exposure start timing for a first pixel of a first row of an image sensor to an exposure end timing for the last pixel of the last row of the image sensor. When following the rolling shutter mode, the "exposure time" may be referred to as a length of a time when an exposure is performed for each row of the image sensor.

The shutter 119 may adjust a time when the first image sensor 114 is exposed to light. For example, when the shutter 119 operates slower, more light may be incident to the first image sensor 114. When the shutter 119 operates faster, less light may be incident to the first image sensor 114. A time when the shutter 119 operates may be adjusted based on a shutter speed. The shutter 119 may include a mechanical shutter or an electronic shutter of a manner of controlling an image sensor.

The OIS driving modules 112 and 115 may dynamically adjust arrangement or position of the lens 111 or the first image sensor 114. In general, the OIS driving modules 112 and 115 may minutely adjust the arrangement or position of the lens 111 or the first image sensor 114 in a direction opposite to a shake direction of a hand which holds the electronic device 100. Thus, motion of an image, which may occur due to the shaking of the hand may be offset. According to various embodiments, the OIS driving modules 112 and 115 may be referred to as a vibration reduction (VR) module, an image stabilizer (IS), an optical stabilizer (OS), an anti-shake (AS) module, a steady shot module, or the like according to a manufacturer of the electronic device 100. The image sensor I/F 130 may serve as a medium for data transmission and reception between the first image sensor 114 and another component (e.g., an ISP 135). For example, image data generated by the first image sensor 114 may be delivered to the ISP 135.

The ISP 135 may include a plurality of imaging processing blocks (hereinafter referred to as "IP blocks"). The ISP 135 may correct a first image obtained from the first camera 110 through the plurality of IP blocks, a second image obtained from the second camera 120, or a third image in which the first image and the second image are synthesized. For example, the plurality of IP blocks may include various IP blocks, such as an IP block for color interpolation, an IP block for lens shading correction, an IP block for auto white balance, an IP block for lateral chromatic aberration correction, an IP block for optical inverse correction, an IP block for noise reduction, an IP block for edge enhancement, an IP block for gamma correction, or an IP block for out of focusing. Each of the plurality of IP blocks may be referred to as an image processing filter, an image processing module, or the like. Furthermore, according to various embodiments, the ISP 135 may be included in the processor 150. The processing by the ISP 135 may be performed after correction or synthesis of the processor 150.

The display 140 may visually output a variety of content (e.g., a text, an image, a video, an icon, a widget, a symbol, or the like) to a user. According to an embodiment, the display 140 may include a touch sensor. Thus, the display 140 may receive a touch, gesture, proximity, or a hovering input using an electronic pen or a part of a user's body.

The memory 145 may include a volatile and/or nonvolatile memory. The memory 145 may store, for example, a command or data associated with at least one other component(s) of the electronic device 100. For example, the memory 145 may store instructions, when executed, causing the processor 150 to perform various operations (e.g., operations shown in FIGS. 2A to 6) described in the present disclosure. The instructions may be implemented with software, for example, an application program, an operating system (OS), or firmware to be stored in the memory 530 or may be embedded in hardware.

The processor 150 may be electrically connected with the components included in the electronic device 100 to execute an arithmetic operation or data processing associated with control and/or communication of the components included in the electronic device 100.

According to an embodiment, the processor 150 may obtain a first image based on a first exposure period and a first read-out speed using the first camera 110. The first image may have a difference of a first exposure timing in units of at least one row of the pixel array of the first image sensor 114.

According to an embodiment, the processor 150 may obtain a plurality of second images based on a second exposure period including the first exposure period and a second read-out speed using the second camera 120. The plurality of second images may have a difference of a second exposure start timing in units of at least one row of a pixel array of the second image sensor 124. The processor 150 may temporarily store the plurality of obtained second images in the buffer 125.

According to an embodiment, the processor 150 may generate a third image having an exposure approximating the first image by synthesizing at least some of the plurality of second images.

In various embodiments, the third image having an exposure approximating the first image may have an exposure timing and an exposure period which approximate the first image with respect to a region corresponding to the first image in the third image. Further, a difference of an exposure start timing between rows of the pixel array of the first image sensor 114 corresponding to the first image which is generated in the rolling shutter mode may approximate in the third image.

In various embodiments, the lens 111 of the first camera 110 and a lens of the second camera 120 may have different angles of view. For example, a camera including a lens with a wide angle of view may be referred to as a wide-angle camera, and a camera including a lens with a narrow angle of view may be referred to as a narrow-angle camera.

In an embodiment, the first camera 110 and the second camera 120 may have different read-out times. An exposure and read-out may be performed in units of one or more rows of a pixel array of an image sensor by the rolling shutter mode. In the present disclosure, for convenience of description, an embodiment is exemplified as an exposure and read-out are performed in units of one row of the pixel array. However, embodiments are not limited thereto. For example, an exposure and read-out may be performed in units of predetermined two or more rows. A read-out speed may be referred to as the number of rows of the pixel array of the image sensor, processed during a total read-out time. Since an exposure and read-out are performed for each row of the pixel array in the rolling shutter mode, the first image sensor 114 and the second image sensor 124 may vary for each row in exposure start time and read-out start timing.

Alternatively, the read-out speed may be referred to as a magnitude of an angle of view in a vertical direction on an optical image imaged on the image sensor (hereinafter simply called "angle view in the vertical direction"), processed during a total read-out time. For example, a vertical angle of view may be in proportion to the number of rows of the image sensor.

Hereinafter, with reference to FIGS. 2A to 5B, for example, a description will be given of an operation of an electronic device 100 of the present disclosure when the electronic device 100 includes two cameras. However, embodiments are not limited thereto. For example, the electronic device 100 may include three or more cameras.

FIGS. 2A to 5B illustrate diagrams of recording a size of an angle r(θ) of view in a vertical direction on an optical image imaged on an image sensor of each camera, an exposure start timing (straight line AB or straight line EF) for the image sensor, an exposure end timing (straight line GH or straight line CD), an exposure time T(ex)-1 or T(ex)-2, an exposure period, a read-out time T(r) over time. A read-out speed per angle of view in a vertical direction of a camera by a rolling shutter mode may be referred to as a slope of a parallelogram (ABCD or EFGD). A camera in which the read-out speed per angle of view in the vertical direction of the camera is slower may be referred to as a first camera 110 of FIG. 1, and a camera in which the read-out speed per angle of view in the vertical direction of the camera is faster may be referred to as a second camera 120 of FIG. 1. Hereinafter, the "read-out speed" used herein may be referred to as a read-out speed per angle of view in the vertical direction of the camera or a read-out speed per row of a pixel array of an image sensor.

Figure 2A:
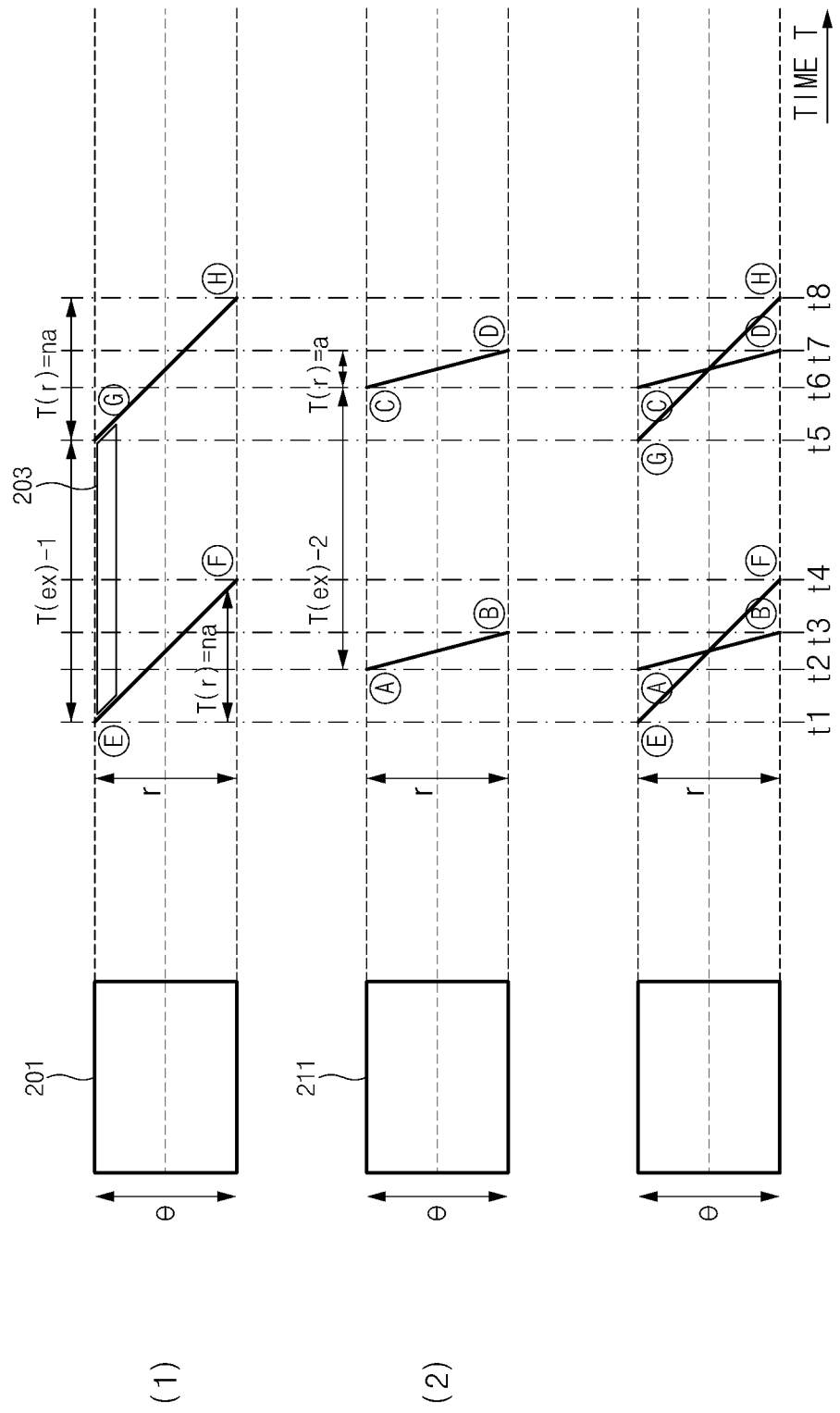
FIGS. 2A and 2B are drawings illustrating an operation of an electronic device when angles of view of a camera are the same as each other and when read-out times of the camera are different from each other, in various embodiments of the present disclosure.
Figure 2B:
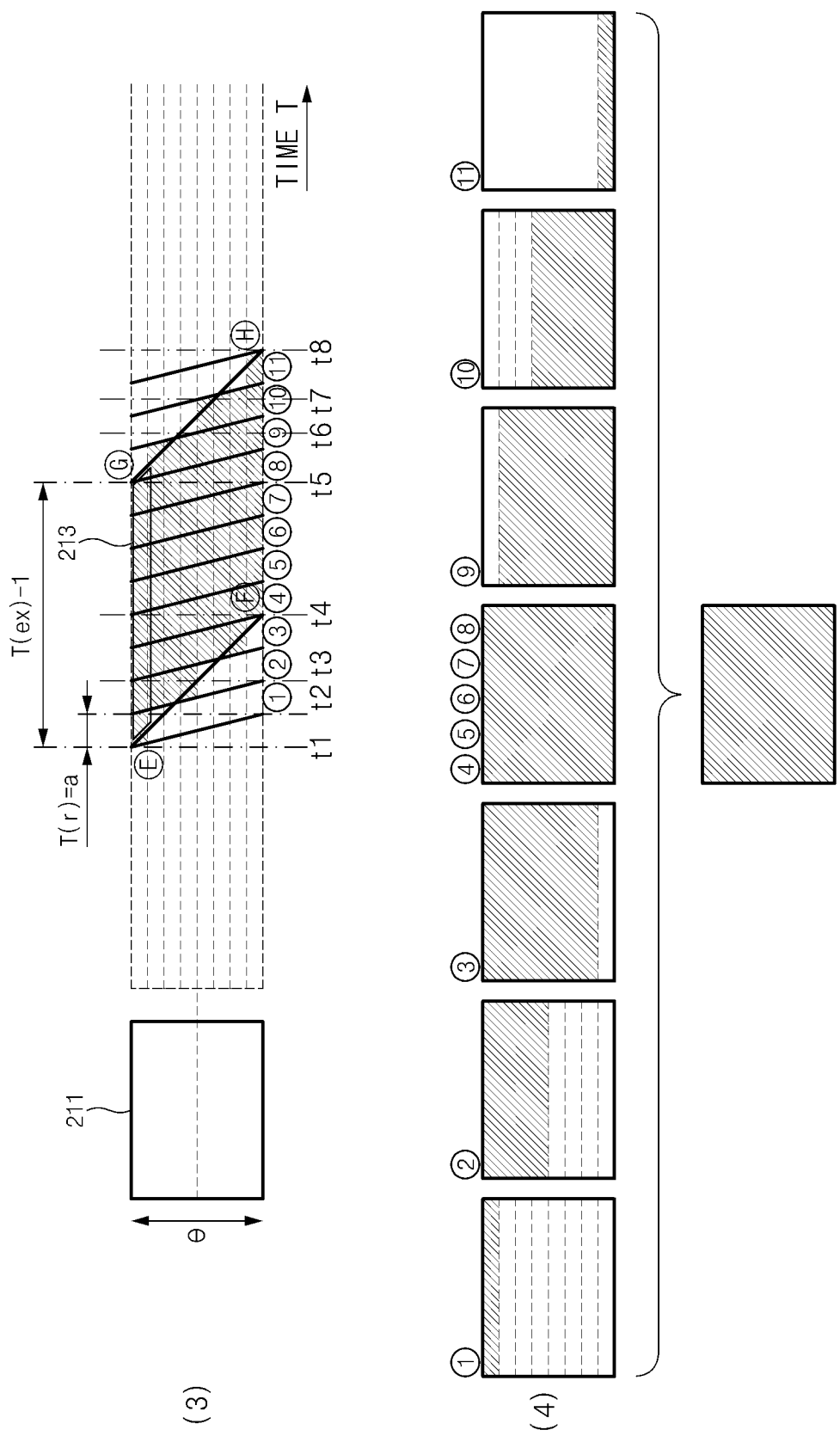

FIGS. 2A and 2B are drawings illustrating an operation of an electronic device when angles of view of a camera are the same as each other and when read-out times of the camera are different from each other, in various embodiments of the present disclosure.

Referring to FIGS. 2A to 2B, diagrams for two cameras in which angles r(θ) of view in a vertical direction on optical images respectively imaged on image sensors 201 and 211 are the same as each other and in which read-out times T(r) per angle of view in the vertical direction are different from each other are shown. For example, the two cameras may be referred to as cameras, each of which mounts a lens with the same vertical angle of view. For example, an r value may be in proportion to the number of rows of a pixel array of an image sensor.

An angle of view in a vertical direction on an optical image imaged on the image sensor 201 of the camera in FIG. 2A(1) is r(θ) and a read-out time T(r) for one screen is na. An angle of view in a vertical direction of an optical image imaged on the image sensor 211 of the camera in FIG. 2A(2) is r(θ) and a read-out time T(r) for one screen is a. The camera of FIG. 2a(1) may spend n times more time processing the same angle r of view than the camera of FIG. 2A(2). Thus, a read-out speed per angle of view in a vertical direction of the camera of FIG. 2A(1) may be n times slower than a read-out speed per angle of view in a vertical direction of FIG. 2A(2). The camera of FIG. 2A(1) may be referred to as a low-speed camera (e.g., a first camera 110 of FIG. 1), and the camera of FIG. 2A(2) may be referred to as a high-speed camera (e.g., a second camera 120 of FIG. 1).

Referring to FIG. 2A(1), an exposure start timing is t1 and an exposure end timing is t5 with respect to a first row of a pixel array of the image sensor 201 of the low-speed camera. An exposure start timing is t4 and an exposure end timing is t8 with respect to the last row of the pixel array of the image sensor 201 of the low-speed camera. An exposure period of the low-speed camera may be from t1 to t8, and an exposure time of the low-speed camera is T(ex)-1.

Referring to FIG. 2A(2), an exposure start timing is t2 and an exposure end timing is t6 with respect to a first row of a pixel array of the image sensor 211 of the high-speed camera. An exposure start timing is t3 and an exposure end timing is t7 with respect to the last row of the pixel array of the image sensor 211 of the high-speed camera. An exposure period of the high-speed camera may be from t2 to t7, and an exposure time of the high-speed camera is T(ex)-2.

In an embodiment, a processor 150 of an electronic device 100 of FIG. 1 may obtain a first image having the first exposure time T(ex)-1 for each row of the pixel array of the image sensor 201 of the low-speed camera based on the read-out time na in the exposure period of t1 to t8 using the low-speed camera.

In an embodiment, the processor 150 may obtain a second image having the second exposure time T(ex)-2 for each row of the pixel array of the image sensor 211 of the high-speed camera based on the read-out time a in the exposure interval of t2 to t7 using the high-speed camera.

The image (hereinafter referred to as "first image") obtained from the low-speed camera and the image (hereinafter referred to as "second image") obtained from the high-speed camera may have a difference between exposure start timings for each row of a pixel array of an image sensor. However, to synthesize the first image and the second image, the first image and the second image should have a difference between exposure start timings, which are substantially the same or similar to each other, for each row of the pixel array of the image sensor.

Referring to FIGS. 2A and 2B, straight line EF indicating an exposure start timing of the low-speed camera may differ in slope from straight line AB indicating an exposure start timing of the high-speed camera. Thus, since an exposure start timing of the first image differs from an exposure start timing of the second image, the exposure start timings of the first image and the second image should be identical or approximate to each other to synthesize the first image and the second image. In other words, slopes of straight line EF and straight line AB should approximate to each other.

Furthermore, to synchronize the first image and the second image, an exposure period (an actually exposed exposure timing) for a region of the second image corresponding to the first image should be identical or approximate to an exposure period of the first image.

Referring to FIG. 2A, since the exposure period of the image sensor 201 of the low-speed camera is t1 to t8 and since the exposure period of the image sensor 211 of the high-speed camera is t2 to t7, a mismatch between an exposure in a period of t1 to t2 and an exposure in a period of t7 to t8 may occur.

In an embodiment, the processor 150 may perform read-out a plurality of times during the second exposure period including at least a portion of the first exposure period of the low-speed camera using the high-speed camera to obtain a plurality of second images. The electronic device 100 may obtain an image, an exposure of which approximates the first image, using the plurality of second images. The read-out of the plurality of times may be performed during a one-time exposure. A pixel reset may be initially performed and may fail to be performed until the final read-out is ended. Referring to FIG. 2B, for example, the high-speed camera may perform an exposure during an exposure period of t1 to t8, including an exposure period of t1 to t8 of the low-speed camera.

In an embodiment, the processor 150 may synthesize a third image approximating an exposure of the first image of the low-speed camera, using the plurality of second images of the high-speed camera. The processor 150 may select some of the plurality of second images and may synthesize the selected image into the third image. For example, the processor 150 may generate the third image by synthesizing at least partial regions respectively included in the plurality of second images.

Referring to FIG. 2B(3), the high-speed camera may generate the plurality of second images by performing an exposure during the exposure period of t1 to t8 and repeating read-out the plurality of times from time t2 when the read-out time a of the high-speed camera elapses from time t1.

In an embodiment, each of the plurality of second images may be divided into a plurality of regions in a vertical direction. The number of the regions may be preset. For example, referring to FIG. 2B(3), an embodiment is exemplified as each of the plurality of second images is divided into 8 regions in the vertical direction. However, embodiments are not limited thereto. For example, the predetermined number may be set higher to enhance accuracy or may be set lower to increase a processing speed.

In an embodiment, the processor 150 may generate the third image by selecting and synthesizing some of the regions divided in the vertical direction. For example, each of the regions divided in the vertical direction may correspond to at least one row of the image sensor 211 of the high-speed camera. For example, when the plurality of second images are divided into n regions, the divided regions may be called first to nth regions from the top end, respectively, In an embodiment, each of the divided regions may be selected from the same number of second images. For example, when a first region is selected on a total of 3 second images, the other second to nth regions may be selected on the total of 3 second images. The third image synthesized from the selected regions may have the same exposure period as the second image.

For example, referring to FIG. 2B(3), the plurality of second images of the high-speed camera may be configured with 11 images. The 11 images (numerals 1 to 11 of FIG. 2B(3)) may be referred to as images 2-1 to 2-11, respectively. For example, the image 2-1 may be an image which is exposed during an exposure period of t1 to t2 and which is read out and generated from time t2. Each of the second images may be divided into, for example, 8 vertical regions. The 8 vertical regions may be referred to as first to eighth regions, respectively.

Referring to FIG. 2B(4), for example, a first region from the top end of the image 2-1 may be used for synthesis. First to fourth regions from the top end of the image 2-2 may be used for synthesis. First to seventh regions from the top end of the image 2-3 may be used for synthesis. All (first to eighth regions) of the images 2-4 to 2-8 may be used for synthesis. Second to eighth regions of the image 2-9 may be used for synthesis. Fifth to eighth regions of the image 2-10 may be used for synthesis. An eighth region of the image 2-11 may be used for synthesis.

As described above, the processor 150 may synthesize one third image from the plurality of second images of the high-speed camera. 8 vertical regions of the third image may be synthesized from the same number of second images. For example, the first to eighth regions may be selected from 4 second images. Thus, each of the 8 vertical regions of the third image may be the same exposure period as each vertical region. Furthermore, a region corresponding to the first image of the low-speed camera in the synthesized third image may be an exposure period approximating an exposure period of the first image.

Furthermore, the third image may be synthesized to have an exposure start timing approximating a difference of an exposure start timing a pixel array of the first image sensor 201 has in units of at least one row.

For example, an exposure start timing for each row of the pixel array of the image sensor 201 of the low-speed camera is shown as straight line EF. An exposure start timing for each row of the pixel array of the image sensor 211 of the high-speed camera is shown as straight line AB. Referring to FIG. 2B(3), an exposure time for regions selected among the plurality of second images is shown in the form of an parallelogram EFGH. Some of the divided regions of the plurality of second images may be selected such that the exposure start timing of the image sensor 211 of the high-speed camera is identical or approximate to straight line EF.

In an embodiment, the processor 150 may generate a fourth image by synthesizing the first image of the low-speed camera and the third image synthesized from the plurality of second images of the high-speed camera. For example, the fourth image may be referred to as the final image captured by an electronic device including a dual camera.

In another embodiment, the processor 150 may generate the third image by synthesizing the first image of the low-speed camera and at least some of the plurality of second images, corresponding to the first image. The third image may be referred to as the final image captured by an electronic device including a dual camera.

For example, there may be a first region of the first image exposed in a first period in an exposure period of the low-speed camera. A second region which is exposed in the first period and corresponds to the first region may be selected among regions of the plurality of second images. The second region corresponding to the first region may be referred to as an image region for one portion of a subject captured in common by two cameras. Exposure times of the low-speed camera and the high-speed camera for one portion of a subject captured in common by the low-speed camera and the high-speed camera may be substantially the same or similar to each other.

For example, a first region of the first image corresponding to at least one row 203 of FIG. 2A(1), which is exposed in an exposure period of t1 to t5 and is read out may be selected in the image sensor 201 of the low-speed camera. A second region of the second image corresponding to at least one row of FIG. 2B(3), which is exposed in an exposure period of t1 to t5 and is read out may be selected in the image sensor 211 of the high-speed camera. Likewise, one region of the plurality of second images, corresponding to another exposure period may be selected in the image sensor 201 of the low-speed camera.

Figure 3A:
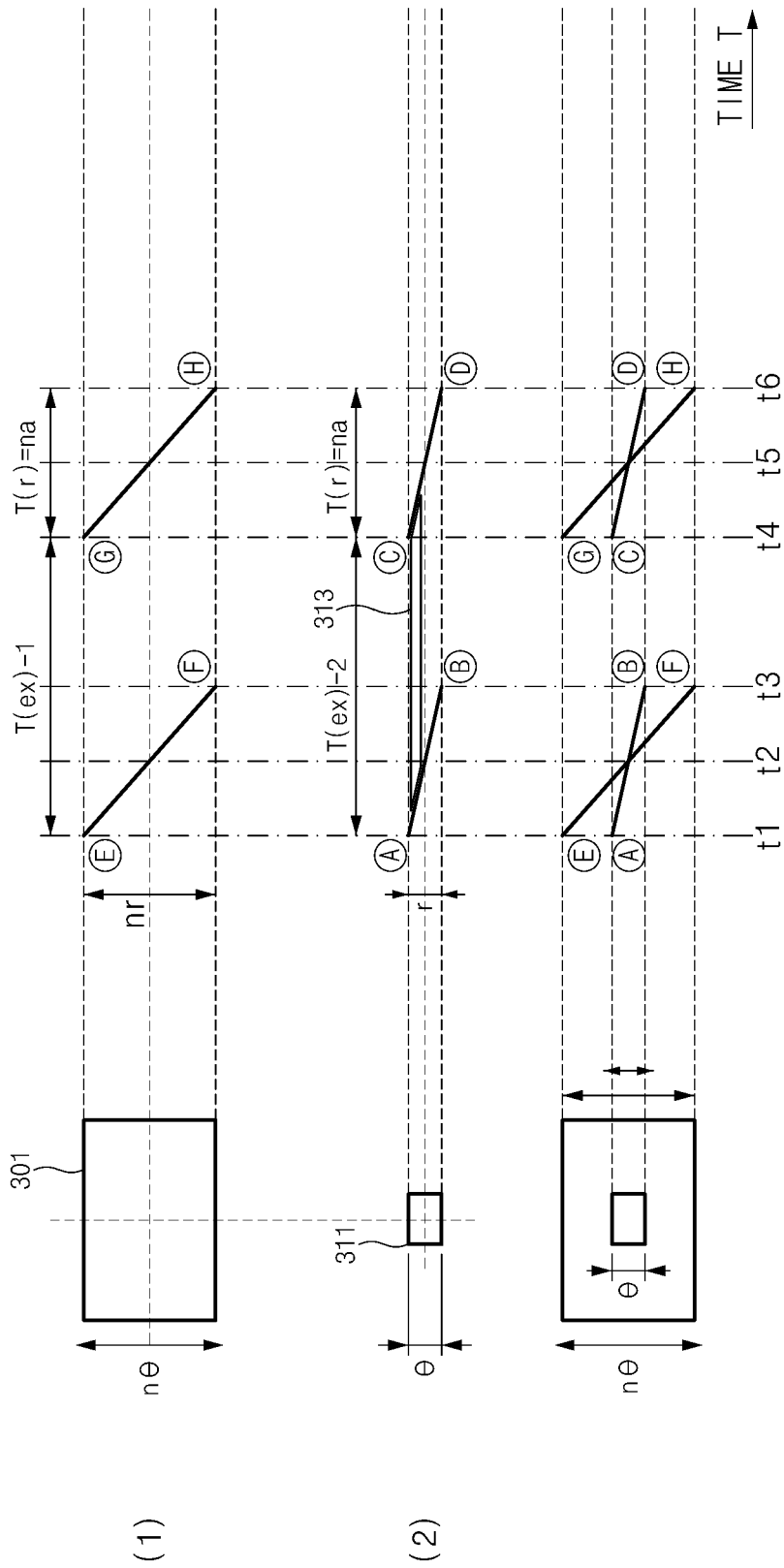
FIGS. 3A and 3B are drawings illustrating an operation of an electronic device when angles of view of a camera are different from each other and when read-out times of the camera are the same as each other, in various embodiments of the present disclosure.
Figure 3B:
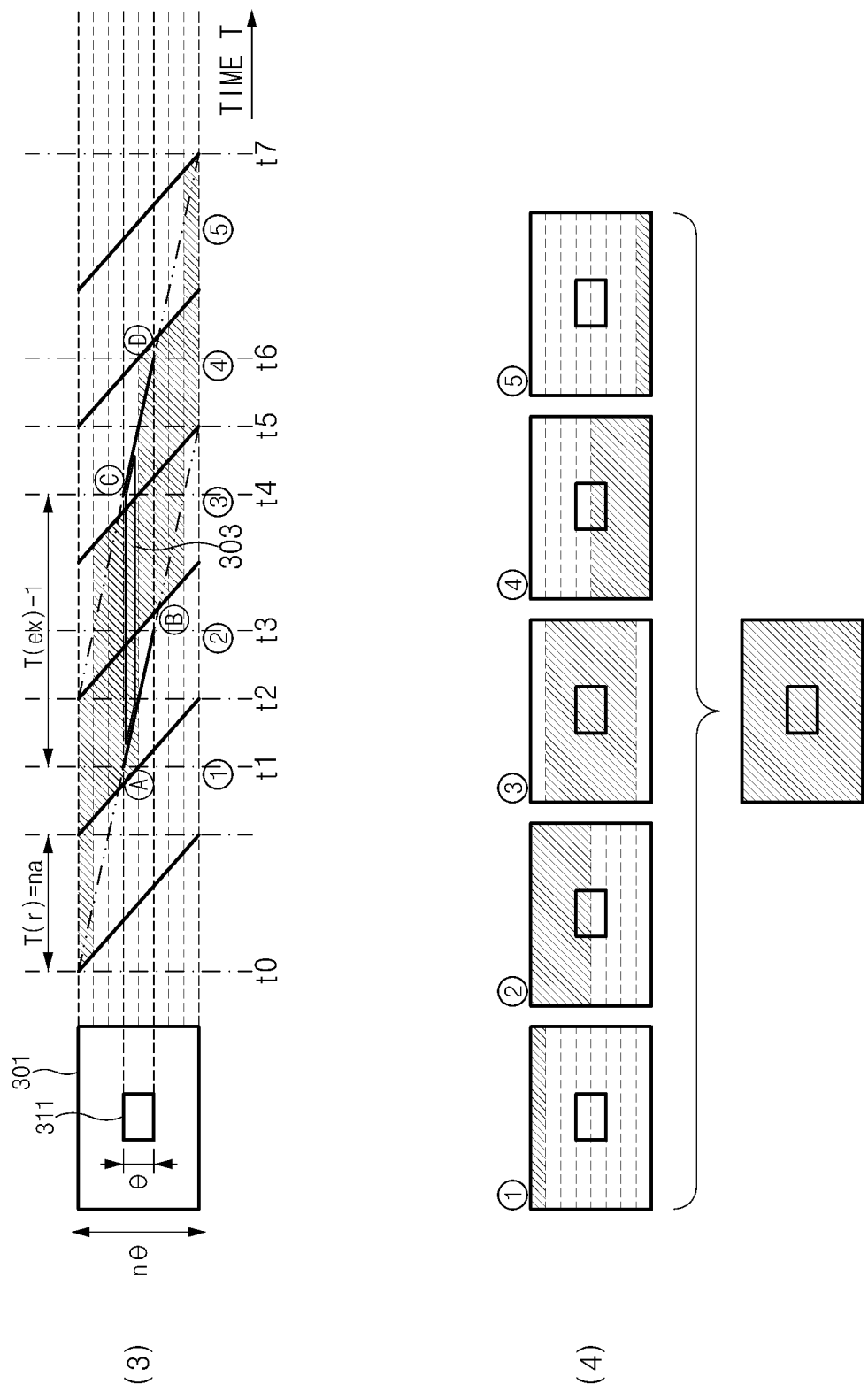

FIGS. 3A and 3B are drawings illustrating an operation of an electronic device when angles of view of a camera are different from each other and when read-out times of the camera are the same as each other, in various embodiments of the present disclosure.

Referring to FIGS. 3A and 3B, diagrams for two cameras in which angles of view are different from each other and in which read-out times are the same as each other are shown. For example, as the two cameras are equipped with different lens and the same image sensor, they may have different vertical angles of view. An embodiment is exemplified as the ratio of the vertical angles of view is n times.

An angle of view in a vertical direction on an optical image imaged on an image sensor 301 of the camera in FIG. 3A(1) is nr(θ) and a read-out time T(r) for one screen is na. An angle of view in a vertical direction on an optical image imaged on an image sensor 311 of the camera in FIG. 3A(2) is r, and a read-out time T(r) for one screen is na. A read-out speed per angle of view in the vertical direction of the camera in FIG. 3A(2) may be n times slower than a read-out speed of the camera in FIG. 3A(1). The camera of FIG. 3A(1) may be referred to as a high-speed camera (e.g., a second camera 120 of FIG. 1), the camera of FIG. 3A(2) may be referred to as a low-speed camera (e.g., a first camera 110 of FIG. 1).

Referring to FIG. 3A(1), an exposure start timing is t1 and an exposure end timing is t4 with respect to a first row of a pixel array of the image sensor 301 of the high-speed camera. An exposure start timing is t3 and an exposure end timing is t6 with respect to the last row of the pixel array of the image sensor 301 of the high-speed camera. An exposure period of the high-speed camera are from t1 to t6, and an exposure time of the high-speed camera is T(ex)-1.

Referring to FIG. 3A(2), an exposure start timing is t1 and an exposure end timing is t4 with respect to a first row of a pixel array of the image sensor 311 of the low-speed camera. An exposure start timing is t3 and an exposure end timing is t6 with respect to the last row of the pixel array of the image sensor 311 of the low-speed camera. An exposure period of the low-speed camera are from t1 to t6, and an exposure time of the high-speed camera is T(ex)-2.

Referring to FIG. 3B, the high-speed camera may perform an exposure during an exposure period including the exposure period of t1 to t6 of the low-speed camera. The high-speed camera may have an angle of view n times greater than the low-speed camera. In this case, the high-speed camera may be referred to as a wide-angle side camera, and the low-speed camera may be referred to as a narrow-angle side camera.

In an embodiment, when the high-speed camera is wider in angle of view than the low-speed camera, an outer image of the angle of view of the low-speed camera should be obtained from the high-speed camera. An exposure of the high-speed camera may be initiated at a time earlier than an exposure start timing of the low-speed camera and may be ended at a time slower than an exposure end timing of the low-speed camera. A one-time exposure for the high-speed camera may be performed during a time including an exposure period of the low-speed camera.

Referring to FIG. 3B(3), an exposure period of the high-speed camera may be set to an exposure period of t0 to t7. The high-speed camera may generate a plurality of second images by repeating read-out a plurality of times from a time when the read-out time na of the high-speed camera elapses from time t0.

In an embodiment, a processor 150 of FIG. 1 may synthesize a third image approximating an exposure of a first image of the low-speed camera, using the plurality of second images of the high-speed camera. For example, the processor 150 may select some of the plurality of second images and may synthesize the selected images into the third image.

FIGS. 3B(3) and 3B(4) illustrate one example of synthesizing the third image.

Referring to FIG. 3B(3), for example, the plurality of second images of the high-speed camera may be configured with 5 images. The second images (numerals 1 to 5 of FIG. 3B(3)) may be referred to as images 2-1 to 2-5. Each of the second images may be divided into, for example, 8 vertical regions. The 8 vertical regions may be referred to as first to eighth regions, respectively.

Referring to FIG. 3B(4), for example, a first region from the top end of the image 2-1 may be used for synthesis. first to fourth regions from the top end of the image 2-2 may be used for synthesis. second to seventh regions of the image 2-3 may be used for synthesis. fifth to eighth regions of the image 2-4 may be used for synthesis. An eighth region of the image 2-5 may be used for synthesis.

As described above, the processor 150 may synthesize one third image from the plurality of second images of the high-speed camera. 8 vertical regions of the third image may be synthesized from the same number of second images. For example, all the first to eighth regions may be selected from two second images.

Thus, an exposure period of each vertical region of the third image may be the same exposure period as each vertical region. Furthermore, a region corresponding to the first image of the low-speed camera in the synthesized third image may be an exposure period approximating an exposure period of the first image.

Furthermore, the third image may be synthesized to have an exposure start timing approximating a difference of an exposure start timing a pixel array of the image sensor 311 has in units of at least one row.

Referring to FIGS. 3A and 3B, an exposure start timing for the image sensor 301 of the high-speed camera may be represented as straight line EF, and an exposure start timing for the image sensor 311 of the low-speed camera may be represented as straight line AB. Exposure start timings of the regions selected among the plurality of second images may have a straight form extended from straight line AB. A difference value of an exposure start timing of the third image may have a value approximating an exposure start value of the first image.

In another embodiment, the processor 150 may generate a third image by synthesizing the first image of the low-speed camera and at least some of the plurality of second images, corresponding to the first image.

For example, a first region of the first image, corresponding to at least one row 313 which is exposed in an exposure period of t1 to t4 and is read out, may be selected. A second region of the second image, corresponding to at least one row 303 of FIG. 3B(3) which is exposed in an exposure period of t1 to 4 and is read out, may be selected. Likewise, one region of the plurality of second images, corresponding to another exposure period, may be selected in the image sensor 311 of the low-speed camera.

FIGS. 4A to 4D and FIGS. 5A and 5B are drawings illustrating an operation of an electronic device when angles of view of a camera are different from each other and when read-out times of the camera are different from each other, in various embodiments of the present disclosure.

Referring to FIGS. 4A to 4D, diagram of two different cameras, angles of view of which are different from each other and read-out times of which are different from each other. For example, as the two cameras are loaded with different lens and different image sensors, respectively, they may have different vertical angles of view.

Figure 4A:
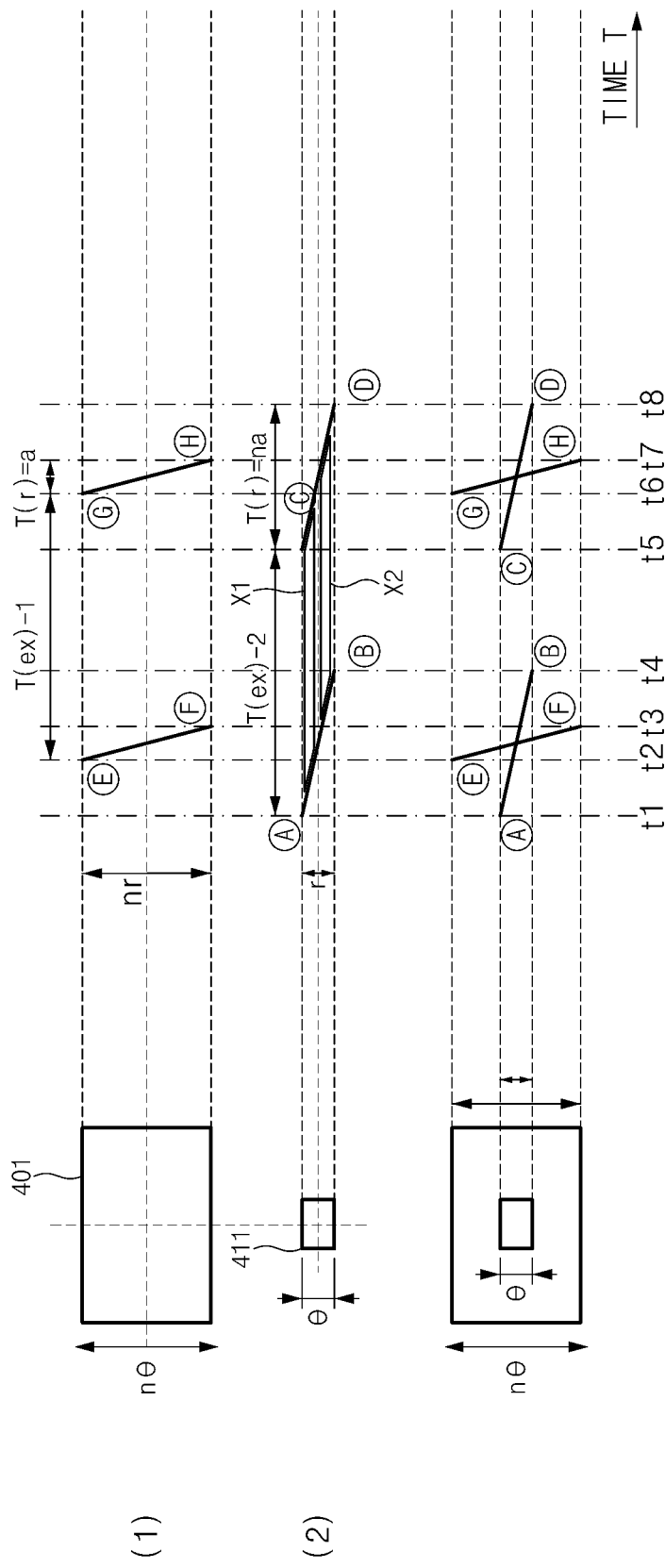
FIGS. 4A to 4D and FIGS. 5A and 5B are drawings illustrating an operation of an electronic device when angles of view of a camera are different from each other and when read-out times of the camera are different from each other, in various embodiments of the present disclosure.

An angle of view in a vertical direction on an optical image imaged on an image sensor 401 of the camera in FIG. 4A(1) is nr(θ) and a read-out time T(r) for one screen is a. An angle of view in a vertical direction on an optical image imaged on an image sensor 411 of the camera in FIG. 4A(2) is r, and a read-out time T(r) for one screen is na. A read-out speed of the camera of FIG. 4A(1) may be $n^2$ times faster than a read-out speed of the camera of FIG. 4A(2). The camera of FIG. 4A(1) may be referred to as a high-speed camera (e.g., a second camera 120 of FIG. 1), and the camera of FIG. 4A(2) may be referred to as a low-speed camera (e.g., a first camera 110 of FIG. 1).

Referring to 4A(1), an exposure start timing is t2 and an exposure end timing is t6 with respect to a first row of a pixel array of the image sensor 401 of the high-speed camera. An exposure start timing is t3 and an exposure end timing is t7 with respect to the last row of the pixel array of the image sensor 401 of the high-speed camera. An exposure period of the high-speed camera is from t2 to t7, and an exposure time of the high-speed camera is T(ex)-1.

Referring to 4A(2), an exposure start timing is t1 and an exposure end timing is t5 with respect to a first row of a pixel array of the image sensor 411 of the low-speed camera. An exposure start timing is t4 and an exposure end timing is t8 with respect to the last row of the pixel array of the image sensor 411 of the low-speed camera. An exposure period of the low-speed camera is from t1 to t8, and an exposure time of the low-speed camera is T(ex)-2.

The high-speed camera may perform an exposure during a period including the exposure period of t1 to t8 of the low-speed camera. The high-speed camera may be referred to as a wide-angle side camera, and the low-speed camera may be a narrow-angle side camera. Thus, an exposure of the high-speed camera may be initiated at a time earlier than the exposure start timing of the low-speed camera and may be ended at a time later than the exposure end timing of the low-speed camera.

Figure 4B:
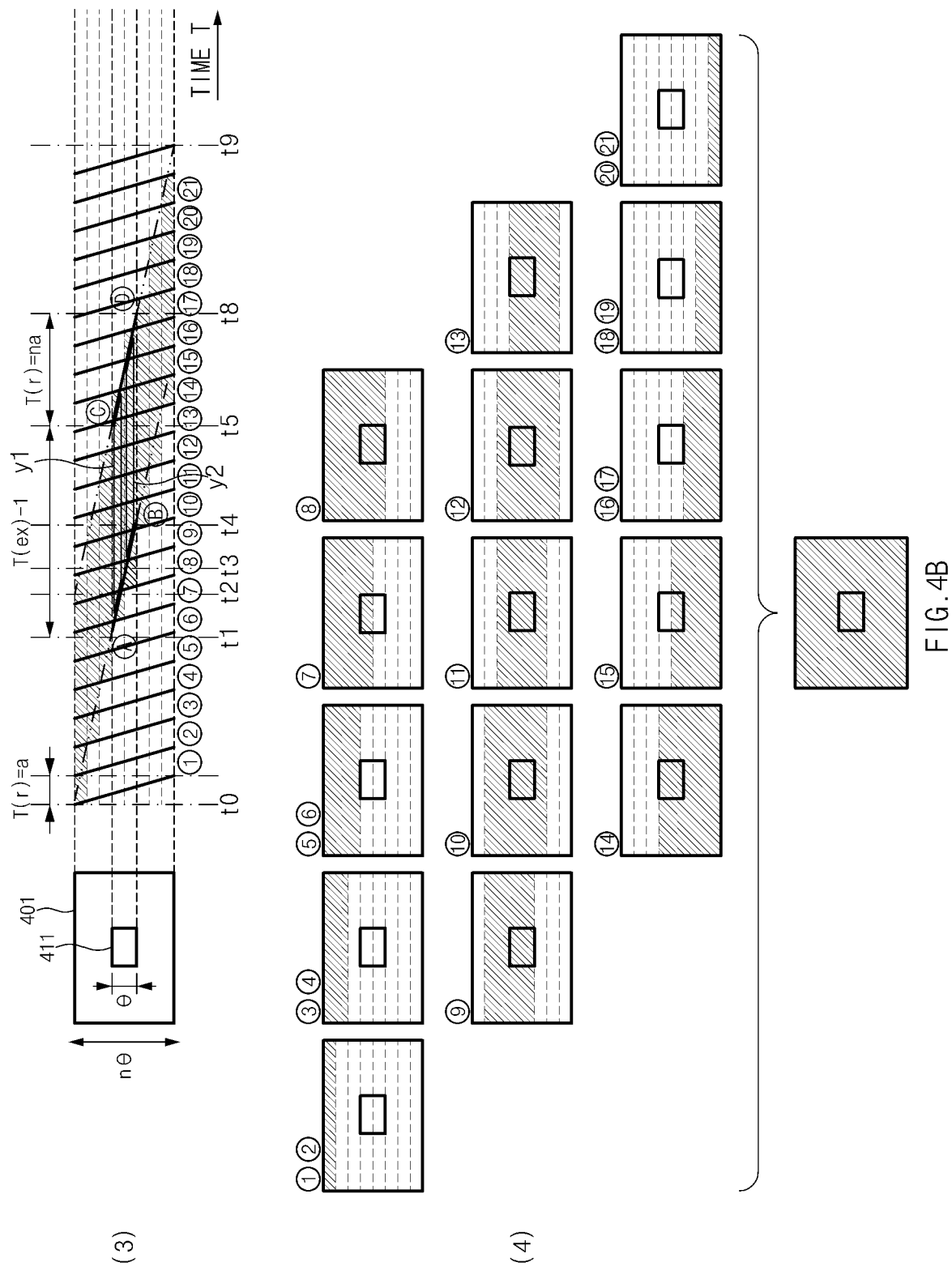

Referring to FIG. 4B(3), an exposure period of the high-speed camera may be set to an exposure period of t0 to t9. The high-speed camera may generate a plurality of second images by repeating read-out a plurality of times from a time when the read-out time a of the high-speed camera elapses from t0.

In an embodiment, a processor 150 of FIG. 1 may analyze a third image approximating an exposure of a first image of the low-speed camera, using the plurality of second images of the high-speed camera.

FIGS. 4B(3) and 4B(4) illustrate one example of synthesizing the third image. For example, referring to FIG. 4B(3), the plurality of second images of the high-speed camera may be configured with 21 images. The second images (numerals 1 to 21 of FIG. 4B(3)) may be referred to images 2-1 to 2-21, respectively. Each of the second images may be divided into, for example, 8 vertical regions. The 8 vertical regions may be referred to as first to eighth regions, respectively.

Referring to FIG. 4B(4), a first region from the top end of the image 2-1 or 2-2 may be used for synthesis. First and second regions from the top end of the image 2-2 or 2-4 may be used for synthesis. First to third regions from the top end of the image 2-5 or 2-6 may be used for synthesis. First to fourth regions from the top end of the image 2-7 may be used for synthesis. First to fifth regions from the top end of the image 2-8 may be used for synthesis. Second to fifth regions of the image 2-9 may be used for synthesis. Second to sixth regions of the image 2-10 may be used for synthesis. Third to sixth regions of the image 2-11 may be used for synthesis. Third to seventh regions of the image 2-12 may be used for synthesis. Fourth to seventh regions of the image 2-13 may be used for synthesis. Fourth to eighth regions of the image 2-14 may be used for synthesis. Fifth to eighth regions of the image 2-15 or 2-16 may be used for synthesis. Sixth to eighth regions of the image 2-17 may be used for synthesis. Seventh and eighth regions of the image 2-18 or 2-19 may be used for synthesis. An eighth region of the image 2-20 or 2-21 may be used for synthesis.

As described above, the processor 150 may synthesize one third image from the plurality of second images of the high-speed camera. All of 8 vertical regions of the third image may be synthesized from the same number of second images. Thus, an exposure period of each vertical region of the third image may be the same exposure period as each vertical region. Furthermore, a region corresponding to the first image of the low-speed camera in the synthesized third image may be an exposure period approximating an exposure period of the first image of the low-speed camera.

Referring to FIGS. 4A and 4B, an exposure start timing for the image sensor 401 of the high-speed camera may be represented as straight line EF, and an exposure start timing for the image sensor 411 of the low-speed camera may be represented as straight line AB. Exposure start timings of regions selected among the plurality of second images may have a straight form extended from straight line AB. A difference value of an exposure start timing of the third image may have a value approximating an exposure start timing of the third image.

In various embodiments, when a read-out speed of the high-speed camera is too fast, there may be excessive numbers of obtained images. In this case, the processor 150 of the electronic device 100 may reduce the number of the plurality of obtained second images by increasing an exposure time of each of the second images of the high-speed camera.

Figure 4C:
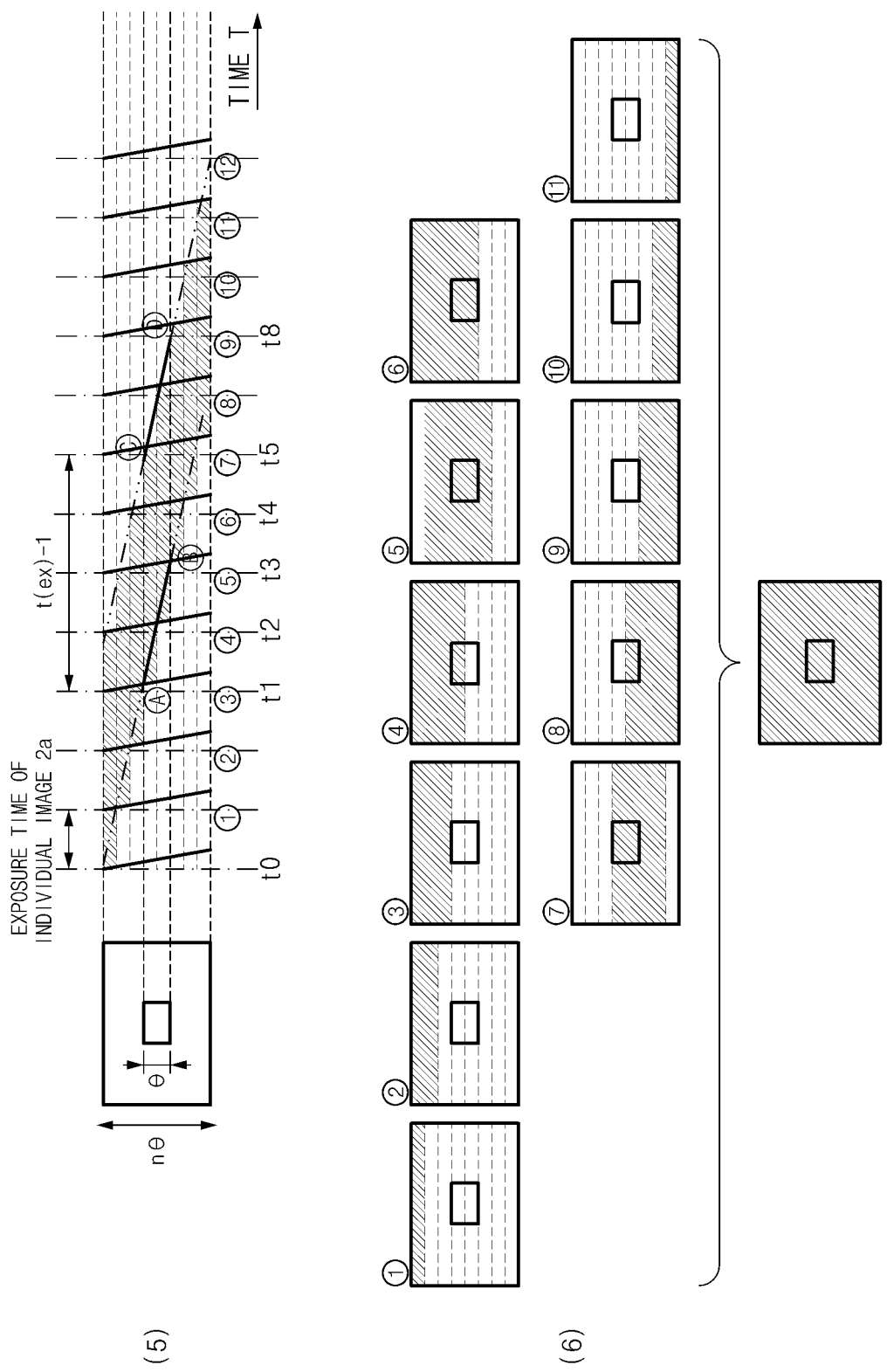

Referring to FIG. 4C(5), a diagram of increasing an exposure time of each of the second images of the high-speed camera from a to 2a is shown. The number of the plurality of obtained images is reduced.

In an embodiment, the processor 150 may synthesize a third image approximating an exposure of a first image of the low-speed camera, from a reduced number of second images of the high-speed camera.

FIGS. 4C(5) and 4C(6) illustrate one example of synthesizing the third image.

Referring to FIG. 4C(5), for example, the plurality of second images of the high-speed camera may be configured with 12 images. The second images (numerals 1 to 12 of FIG. 4C(5)) may be exemplified as images 2-1 to 2-12. Each of the second images may be divided into 8 vertical regions. The 8 vertical regions may be referred to as first to eighth regions, respectively.

Referring to FIG. 4C(6), a first region of the image 2-1 may be used for synthesis. First and second regions of the image 2-2 may be used for synthesis. First to third regions of the image 2-3 may be used for synthesis. First to fourth regions of the image 2-4 may be used for synthesis. Second to fifth regions of the image 2-5 may be used for synthesis. Third to sixth regions of the image 2-6 may be used for synthesis. Fourth to seventh regions of the image 2-7 may be used for synthesis. Fifth to eighth regions of the image 2-8 may be used for synthesis. Sixth to eighth regions of the image 2-9 may be used for synthesis. Seventh and eighth regions of the image 2-10 may be used for synthesis. An eighth region of the image 2-11 may be used for synthesis. An image 2-12 may fail to be used for synthesis.

Thus, the processor 150 may synthesize one third image from the plurality of second images of the high-speed camera. Since the 8 vertical regions of the third image are synthesized from the same number of second images, an exposure time of each vertical region may be the same exposure time as each vertical region. Furthermore, a region corresponding to the first image of the low-speed camera in the synthesized third image may be an exposure period approximating an exposure period of the first image of the low-speed camera.

In another embodiment, the processor 150 of the electronic device 100 may reduce the number of the plurality of obtained second images by increasing a read-out time of the high-speed camera.

Figure 4D:
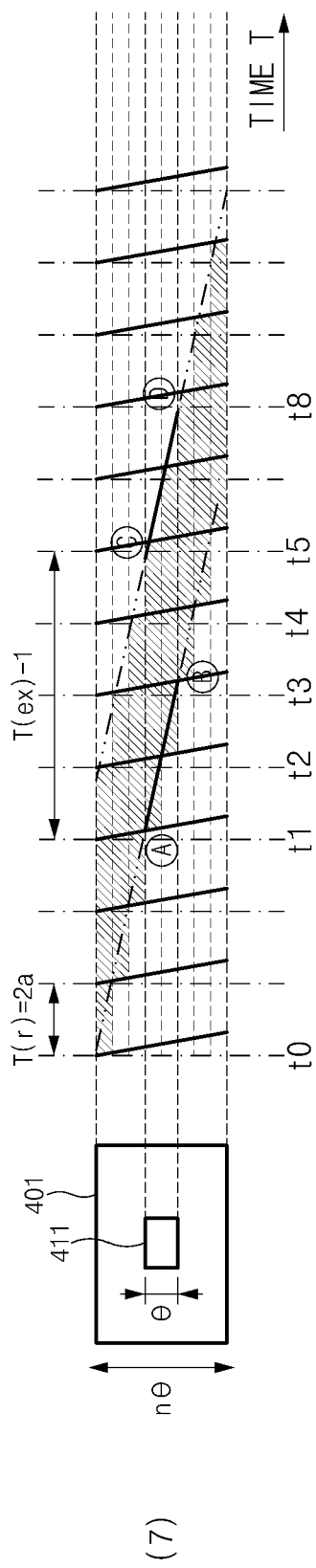

Referring to FIG. 4D(7), a diagram of increasing a read-out time T(r) of the high-speed camera from a to 2a. The number of the plurality of obtained second mages is reduced. The plurality of second images may be synthesized in the same method as those in FIGS. 4D(5) and 4D(6).

Referring to FIGS. 4A and 4B, the processor 150 of the electronic device 100 according to various embodiments may divide the first image into a plurality of regions including a first region corresponding to a first period included in a first exposure period and a second region corresponding to a second period which is included in the first exposure period and is different from the first period. The processor 150 may be configured to generate an image in which the first image and at least some of the plurality of second images are synthesized, at least using a third region which corresponds to the first period and corresponds to the first region among some of the plurality of second regions and a fourth region which corresponds to the second period and corresponds to the second region among the some of the plurality of second regions.

Referring to FIG. 4A(2), the processor 150 may divide the first image into a first region corresponding to a first period x1 in an exposure period of t1 to t8 and a second region corresponding to a second period x2 in an exposure period of t1 to t8. The divided first and second regions may correspond to at least one row of the image sensor 411 of the low-speed camera. For convenience of description, an embodiment is exemplified as the first image is divided into two regions.

Referring to FIG. 4B(3), the processor 150 may specify a third region which corresponds to a first period x1 and corresponds to the first region among some regions of the plurality of second images. For example, a region of a second image obtained by being read out after an exposure period of y1 may be referred to as the third region. The processor 150 may specify a fourth region which corresponds to a second period x2 and corresponds to the second region among some regions of the plurality of second images For example, a region of a second image obtained by being read out after an exposure period of y2 may be referred to as the fourth region.

In an embodiment, the electronic device 100 may generate a third image in which the first image and at least some of the plurality of second images are synthesized, using the first to fourth regions.

For example, the first region of the first image and the third region of the second image may be synthesized, and the second region of the first image and the fourth region of the second image may be synthesized.

In various embodiments, angles of view of cameras may be different from each other. For example, when the low-speed camera is a wide-angle side camera, an outer image of an angle of view of a narrow-angle camera may be synthesized from the first image of the low-speed camera. When the low-speed camera is a narrow-angle side camera, an outer image of an angle of view of the narrow-angle camera may be obtained from the second image of the high-speed camera.

Figure 5A:
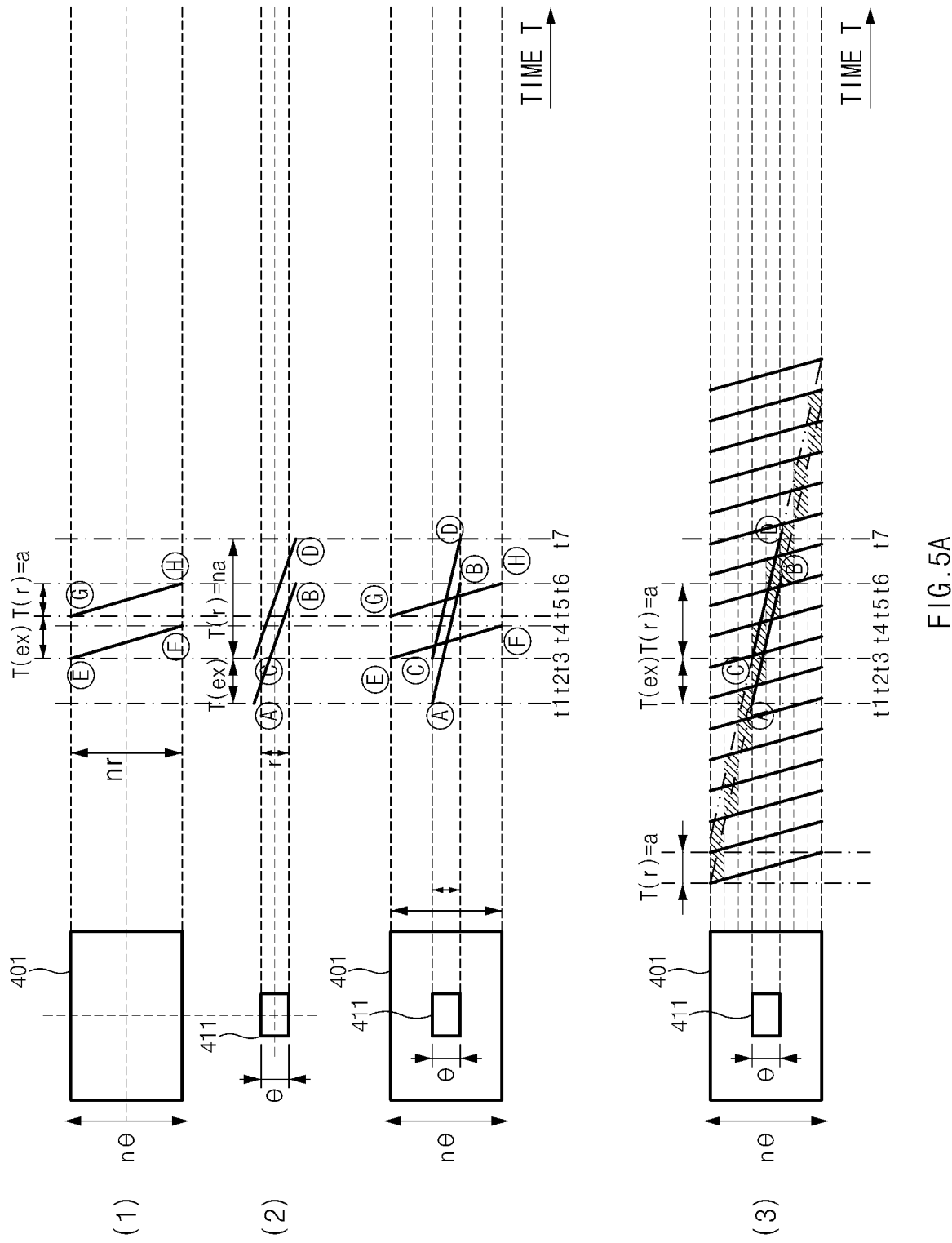

Referring to FIG. 5A, two cameras of more shortening an exposure time than the camera of FIG. 4A is shown. Referring to FIG. 5A(3), although exposure start timings of some regions selected among the plurality of second images of the high-speed camera approximate to straight line AB, it may be seen that accuracy is reduced.

In various embodiments, the processor 150 of the electronic device 100 may be configured to increase a second read-out speed when a length of an exposure period T(ex) of the low-speed camera is less than or equal to a predetermined length.

Figure 5B:
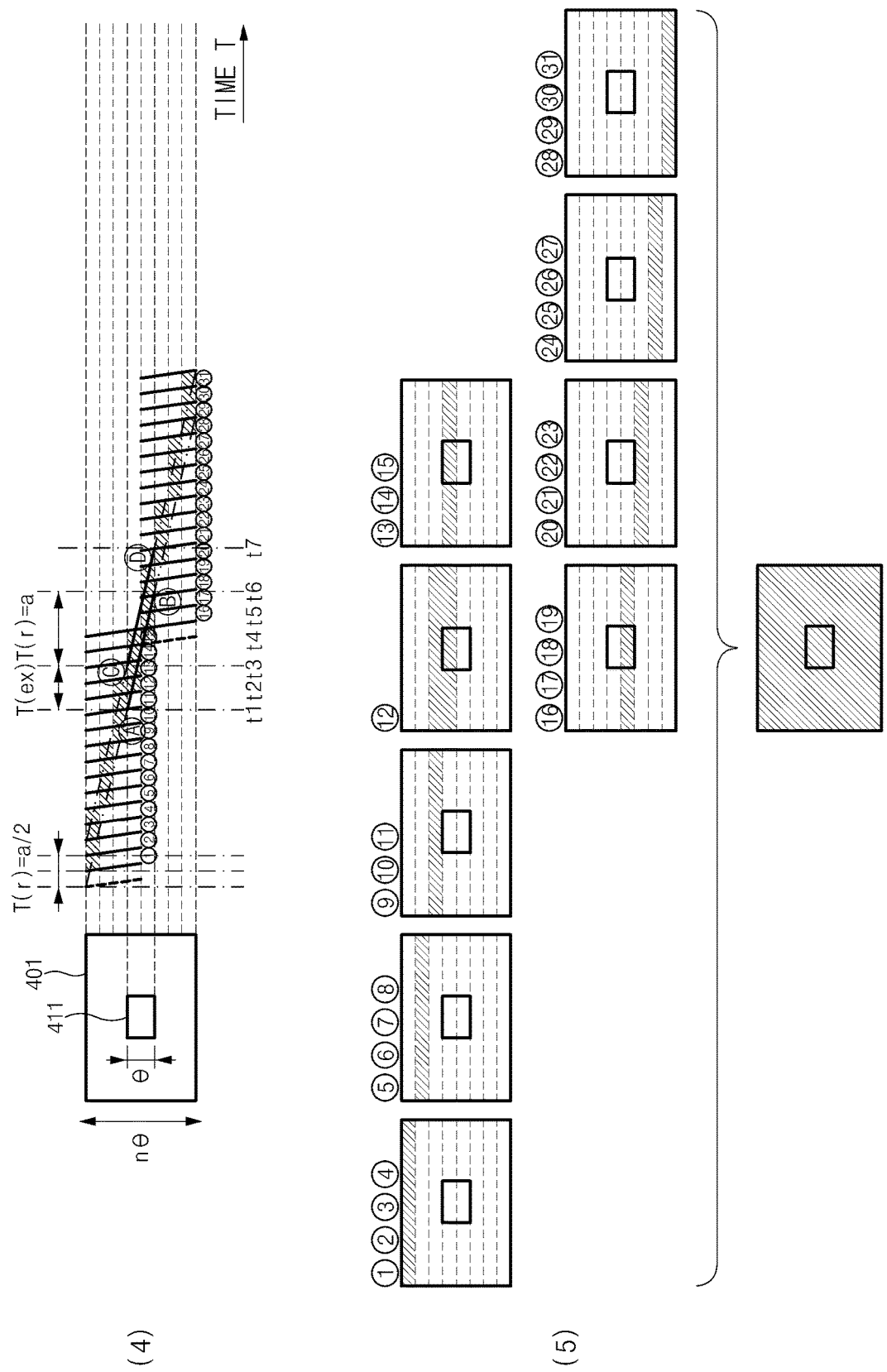

Referring to FIG. 5B(4), an example of reducing a read-out time of the high-speed camera to ½ is shown. As a read-out speed increases, the number of the obtained second images may increases. Since a third image is synthesized from more second images, similarity of the exposure to a first image may be enhanced.

In various embodiments, the processor 150 may be configured to fail to obtain second images corresponding to the entire pixel array of an image sensor 401 and obtain partial images of the second images, corresponding to a portion of a pixel array of the image sensor 401. For example, the high-speed camera may be configured to perform an exposure and read-out until a predetermined row of the pixel array of the image sensor 401. A processing speed of the processor 150 may be enhanced, and an amount of data of second images stored in a buffer 125 of FIG. 1 may be reduced.

Referring to FIG. 5B(4), an example in which an exposure and read-out operation of the image sensor 401 of the high-speed camera is performed in a portion of the pixel array is shown.

In an embodiment, the processor 150 may synthesize a third image approximating an exposure of a first image of the low-speed camera from a plurality of second images obtained for a partial screen of the high-speed camera.

FIGS. 5B(4) and 5B(5) illustrate one example of synthesizing the third image. For example, referring to FIG. 5B(4), the plurality of second images of the high-speed camera may be configured with 31 partial images. The 31 partial images (numerals 1 to 31 of FIG. 5B(4)) may be referred to as images 2-1 to 2-31, respectively. Each of the partial images may be divided into, for example, 8 vertical regions in FIG. 5A(3). The 8 vertical regions may be referred to as first to eighth regions, respectively.

Referring to FIG. 5B(5), the processor 150 may select some of divided vertical regions of a plurality of partial images and may synthesize the selected regions into a third image. A first region of partial images of the images 2-1 to 2-4 may be used for synthesis. A second region of partial images of the images 2-5 to 2-8 may be used for synthesis. A third region of partial images of the images 2-9 to 2-11 may be used for synthesis. Third and fourth regions of partial images of the images 2-12 may be used for synthesis. A fourth region of partial images of the images 2-13 to 2-15 may be used for synthesis. A fifth region of partial images of the images 2-16 to 2-19 may be used for synthesis. A sixth region of partial images of the images 2-20 to 2-23 may be used for synthesis. A seventh region of partial images of the images 2-24 to 2-27 may be used for synthesis. An eighth region of partial images of the images 2-28 to 2-31 may be used for synthesis.

As described above, the processor 150 may synthesize one third image from the plurality of partial images of the high-speed camera. All the 8 vertical regions of the third image may be synthesized from the same number of partial images. Thus, each of the 8 vertical regions of the third image may be the same exposure time as each vertical region. Furthermore, a region corresponding to the first image of the low-speed camera in the synthesized third image may be an exposure period approximating an exposure period of the first image of the low-speed camera.

In various embodiments, the number of the plurality of second images obtained from the high-speed camera may be set based on an exposure time of the low-speed camera and/or a read-out speed of the high-speed camera. For example, the processor 150 of the electronic device 100 may reduce the number of the plurality of second images obtained from the high-speed camera by decreasing a read-out speed of the high-speed camera. For example, the processor 150 may be configured to increase the number of the plurality of obtained second images by increasing an exposure time of the low-speed camera.

Figure 6:
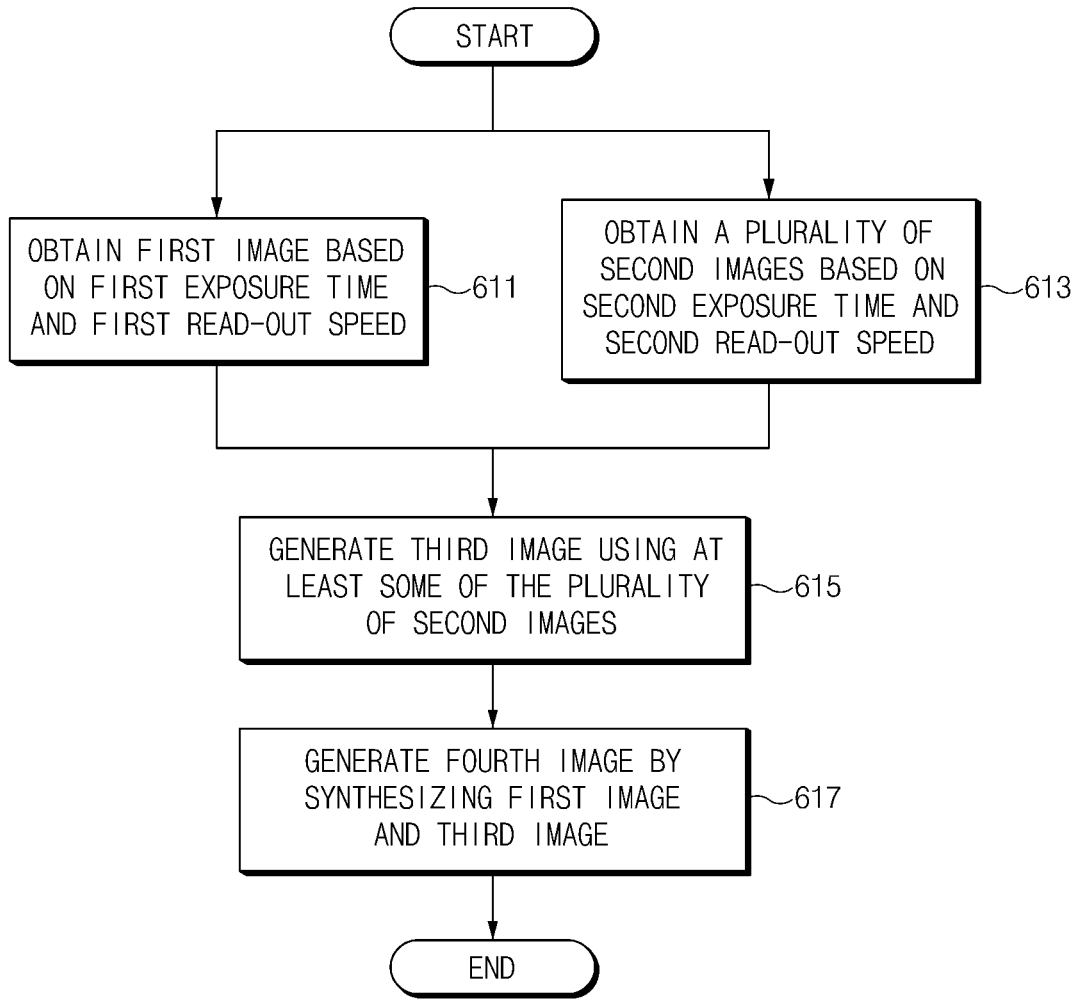
FIG. 6 is a flowchart illustrating a method for generating an image according to an embodiment of the present disclosure.

FIG. 6 is a flowchart illustrating a method for generating an image according to an embodiment of the present disclosure.

Referring to FIG. 6, the method for generating an image according to an embodiment may include operations 611 to 617. Operations 611 to 617 may be performed by, for example, an electronic device (e.g., an electronic device 100 of FIG. 1) including a plurality of cameras.

In operation 611, the electronic device may obtain a first image using a first camera (e.g., a first camera 110 of FIG. 1) based on a first exposure time and a first read-out speed.

In operation 613, the electronic device may obtain a plurality of second images using a second camera (e.g., a second camera 120 of FIG. 1) based on a second exposure time and a second read-out speed.

In operation 615, the electronic device may generate a third image using at least some of the plurality of second images. The third image may approximate an exposure of the first image.

In operation 617, the electronic device may generate a fourth image by synthesizing the first image and the third image. The fourth image may be referred to as the final image captured through the first camera and the second camera.

In another embodiment, operations 615 and 617 may be integrally performed. The electronic device may generate the final image by synthesizing the first image and at least some of the plurality of second images.

Figure 7:
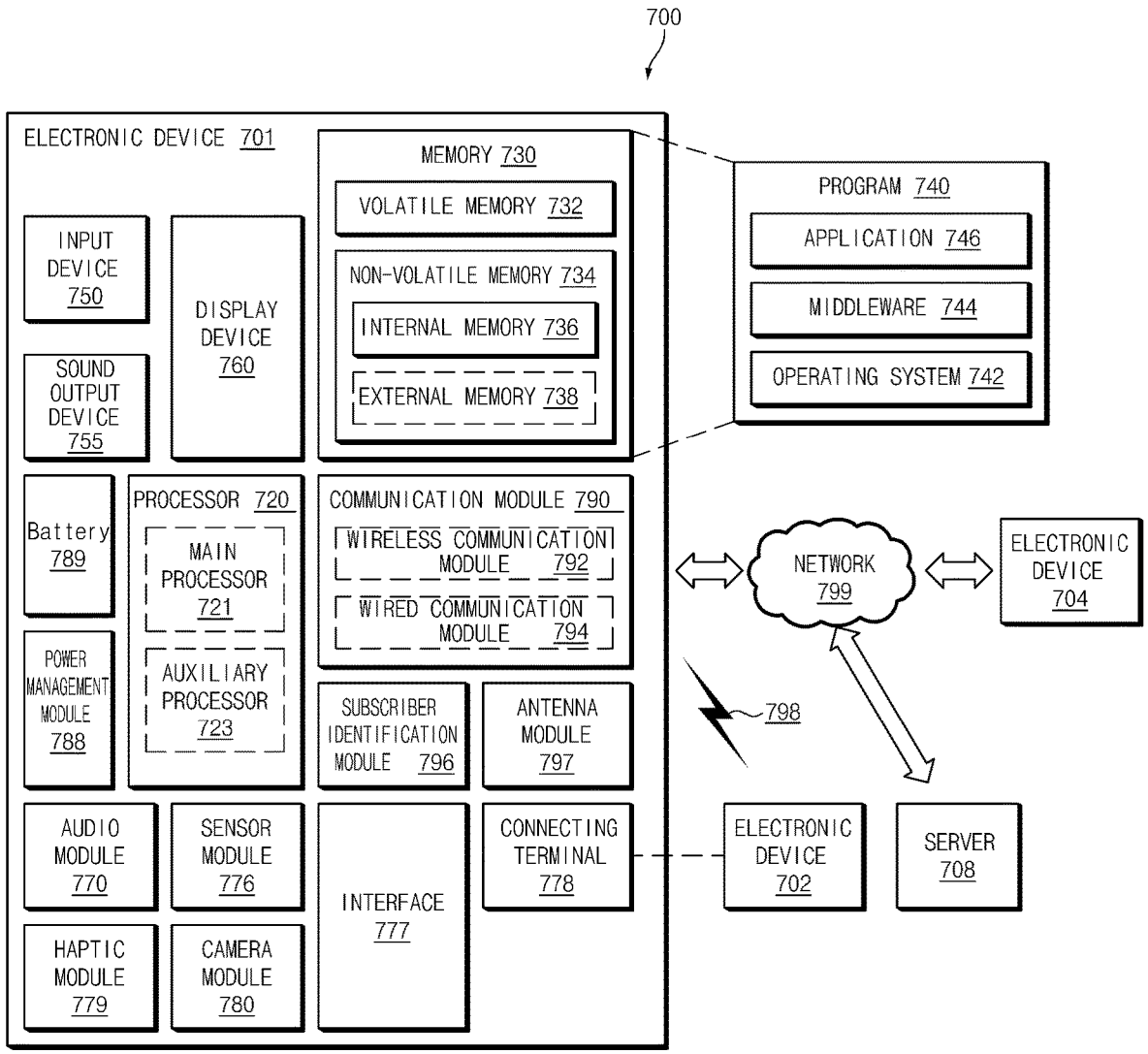
FIG. 7 is a block diagram illustrating a configuration of an electronic device in a network, according to various embodiments.

FIG. 7 is a block diagram of an electronic device 701 in a network environment 700 according to various embodiments. Referring to FIG. 7, the electronic device 701 (e.g., the electronic device 100 of FIG. 1 or the electronic device 600 of FIG. 6) may communicate with an electronic device 702 through a first network 798 (e.g., a short-range wireless communication) or may communicate with an electronic device 704 or a server 708 through a second network 799 (e.g., a long-distance wireless communication) in the network environment 700. According to an embodiment, the electronic device 701 may communicate with the electronic device 704 through the server 708. According to an embodiment, the electronic device 701 may include a processor 720, a memory 730, an input device 750, a sound output device 755, a display device 760, an audio module 770, a sensor module 776, an interface 777, a haptic module 779, a camera module 780, a power management module 788, a battery 789, a communication module 790, a subscriber identification module 796, and an antenna module 797. According to some embodiments, at least one (e.g., the display device 760 or the camera module 780) among components of the electronic device 701 may be omitted or other components may be added to the electronic device 701. According to some embodiments, some components may be integrated and implemented as in the case of the sensor module 776 (e.g., a fingerprint sensor, an iris sensor, or an illuminance sensor) embedded in the display device 760 (e.g., a display).

The processor 720 may operate, for example, software (e.g., a program 740) to control at least one of other components (e.g., a hardware or software component) of the electronic device 701 connected to the processor 720 and may process and compute a variety of data. The processor 720 may load a command set or data, which is received from other components (e.g., the sensor module 776 or the communication module 790), into a volatile memory 732, may process the loaded command or data, and may store result data into a nonvolatile memory 734. According to an embodiment, the processor 720 may include a main processor 721 (e.g., a central processing unit or an application processor) and an auxiliary processor 723 (e.g., a graphic processing device, an image signal processor, a sensor hub processor, or a communication processor), which operates independently from the main processor 721, additionally or alternatively uses less power than the main processor 721, or is specified to a designated function. In this case, the auxiliary processor 723 may operate separately from the main processor 721 or embedded.

In this case, the auxiliary processor 723 may control, for example, at least some of functions or states associated with at least one component (e.g., the display device 760, the sensor module 776, or the communication module 790) among the components of the electronic device 701 instead of the main processor 721 while the main processor 721 is in an inactive (e.g., sleep) state or together with the main processor 721 while the main processor 721 is in an active (e.g., an application execution) state. According to an embodiment, the auxiliary processor 723 (e.g., the image signal processor or the communication processor) may be implemented as a part of another component (e.g., the camera module 780 or the communication module 790) that is functionally related to the auxiliary processor 723. The memory 730 may store a variety of data used by at least one component (e.g., the processor 720 or the sensor module 776) of the electronic device 701, for example, software (e.g., the program 740) and input data or output data with respect to commands associated with the software. The memory 730 may include the volatile memory 732 or the nonvolatile memory 734.

The program 740 may be stored in the memory 730 as software and may include, for example, an operating system 742, a middleware 744, or an application 746.

The input device 750 may be a device for receiving a command or data, which is used for a component (e.g., the processor 720) of the electronic device 701, from an outside (e.g., a user) of the electronic device 701 and may include, for example, a microphone, a mouse, or a keyboard.

The sound output device 755 may be a device for outputting a sound signal to the outside of the electronic device 701 and may include, for example, a speaker used for general purposes, such as multimedia play or recordings play, and a receiver used only for receiving calls. According to an embodiment, the receiver and the speaker may be either integrally or separately implemented.

The display device 760 may be a device for visually presenting information to the user and may include, for example, a display, a hologram device, or a projector and a control circuit for controlling a corresponding device. According to an embodiment, the display device 760 may include a touch circuitry or a pressure sensor for measuring an intensity of pressure on the touch.

The audio module 770 may convert a sound and an electrical signal in dual directions. According to an embodiment, the audio module 770 may obtain the sound through the input device 750 or may output the sound through an external electronic device (e.g., the electronic device 702 (e.g., a speaker or a headphone)) wired or wirelessly connected to the sound output device 755 or the electronic device 701.

The sensor module 776 may generate an electrical signal or a data value corresponding to an operating state (e.g., power or temperature) inside or an environmental state outside the electronic device 701. The sensor module 776 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 777 may support a designated protocol wired or wirelessly connected to the external electronic device (e.g., the electronic device 702). According to an embodiment, the interface 777 may include, for example, an HDMI (high-definition multimedia interface), a USB (universal serial bus) interface, an SD card interface, or an audio interface.

A connecting terminal 778 may include a connector that physically connects the electronic device 701 to the external electronic device (e.g., the electronic device 702), for example, an HDMI connector, a USB connector, an SD card connector, or an audio connector (e.g., a headphone connector).

The haptic module 779 may convert an electrical signal to a mechanical stimulation (e.g., vibration or movement) or an electrical stimulation perceived by the user through tactile or kinesthetic sensations. The haptic module 779 may include, for example, a motor, a piezoelectric element, or an electric stimulator.

The camera module 780 may shoot a still image or a video image. According to an embodiment, the camera module 780 may include, for example, at least one lens, an image sensor, an image signal processor, or a flash.

The power management module 788 may be a module for managing power supplied to the electronic device 701 and may serve as at least a part of a power management integrated circuit (PMIC).

The battery 789 may be a device for supplying power to at least one component of the electronic device 701 and may include, for example, a non-rechargeable (primary) battery, a rechargeable (secondary) battery, or a fuel cell.

The communication module 790 may establish a wired or wireless communication channel between the electronic device 701 and the external electronic device (e.g., the electronic device 702, the electronic device 704, or the server 708) and support communication execution through the established communication channel. The communication module 790 may include at least one communication processor operating independently from the processor 720 (e.g., the application processor) and supporting the wired communication or the wireless communication. According to an embodiment, the communication module 790 may include a wireless communication module 792 (e.g., a cellular communication module, a short-range wireless communication module, or a GNSS (global navigation satellite system) communication module) or a wired communication module 794 (e.g., an LAN (local area network) communication module or a power line communication module) and may communicate with the external electronic device using a corresponding communication module among them through the first network 798 (e.g., the short-range communication network such as a Bluetooth, a WiFi direct, or an IrDA (infrared data association)) or the second network 799 (e.g., the long-distance wireless communication network such as a cellular network, an internet, or a computer network (e.g., LAN or WAN)). The above-mentioned various communication modules 790 may be implemented into one chip or into separate chips, respectively.

According to an embodiment, the wireless communication module 792 may identify and authenticate the electronic device 701 using user information stored in the subscriber identification module 796 in the communication network.

The antenna module 797 may include one or more antennas to transmit or receive the signal or power to or from an external source. According to an embodiment, the communication module 790 (e.g., the wireless communication module 792) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 701 and the external electronic device 704 through the server 708 connected to the second network 799. Each of the electronic devices 702 and 704 may be the same or different types as or from the electronic device 701. According to an embodiment, all or some of the operations performed by the electronic device 701 may be performed by another electronic device or a plurality of external electronic devices. When the electronic device 701 performs some functions or services automatically or by request, the electronic device 701 may request the external electronic device to perform at least some of the functions related to the functions or services, in addition to or instead of performing the functions or services by itself. The external electronic device receiving the request may carry out the requested function or the additional function and transmit the result to the electronic device 701. The electronic device 701 may provide the requested functions or services based on the received result as is or after additionally processing the received result. To this end, for example, a cloud computing, distributed computing, or client-server computing technology may be used.

Figure 8:
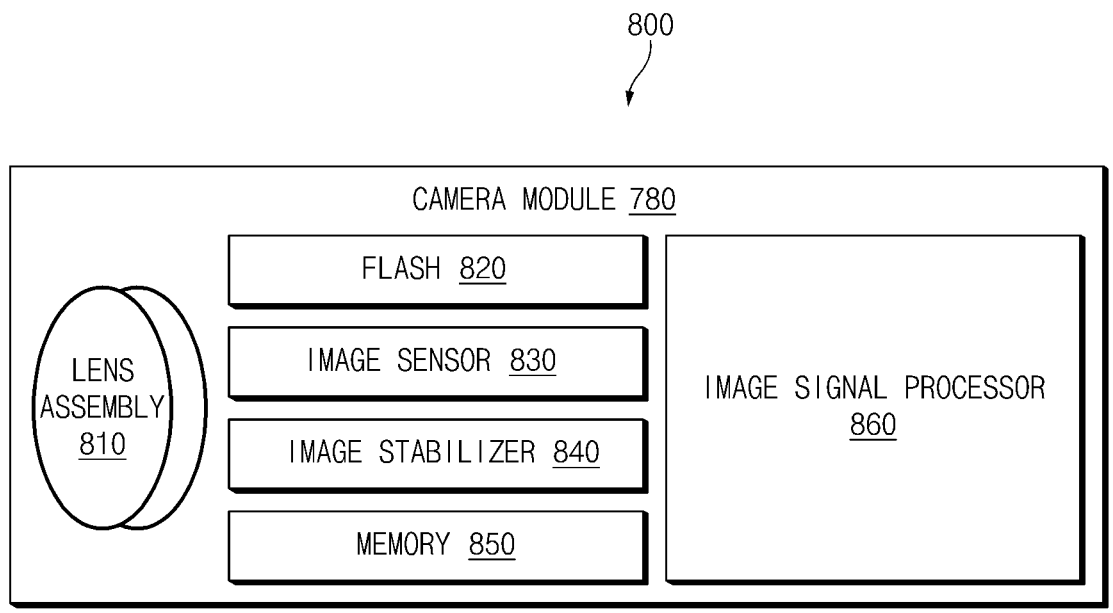
FIG. 8 is a block diagram illustrating a configuration of a camera module according to various embodiments.

FIG. 8 is a block diagram 800 illustrating a camera module 780 according to various embodiments. Referring to FIG. 8, the camera module 780 may include a lens assembly 810, a flash 820, an image sensor 830, an image stabilizer 840, a memory (e.g., a buffer memory) 850, or an image signal processor 860. The lens assembly 810 may collect light emitted from a subject, an image of which is captured. The lens assembly 810 may include one or more lenses. According to an embodiment, the camera module 780 may include the plurality of lens assemblies 810. In this case, the camera module 780 may be, for example, a dual camera, a 360-degree camera, or a spherical camera. The plurality of lens assemblies 810 may have the same lens properties (e.g., a field of view, a focal length, an autofocus, an f number, or an optical zoom), or at least one lens assembly may be at least one other lens property (properties) different from another lens assembly. The lens assembly 810 may include, for example, a wide-angle lens or a telephoto lens. The flash 820 may emit light to intensify light emitted from the subject. The flash 820 may include one or more light emitting diodes (LEDs) (e.g., a red-green-blue (RGB) LED, a white LED, an infrared LED, or an ultraviolet LED), or a xenon lamp.

The image sensor 830 may obtain an image corresponding to the subject by converting light, which is transmitted from the subject through the lens assembly 810, to an electrical signal. According to an embodiment, the image sensor 830 may include one image sensor selected among image sensors, each of has different properties, for example, an RGB sensor, a black and white (BW) sensor, an IR sensor, or a UV sensor, a plurality of image sensors, each of which has the same properties, or a plurality of image sensors, each of which has different properties. Each image sensor included in the image sensor 830 may be implemented with, for example, a charged coupled device (CCD) sensor or a complementary metal oxide semiconductor (CMOS) sensor.

The image stabilizer 840 may perform movement or control (e.g., adjustment of read-out timing, or the like) of at least one lens included in the lens assembly 810 or the image sensor 830 in a specific direction to at least partially compensate for a negative effect (e.g., image motion) on the captured image due to movement of the camera module 780 or the electronic device 701 including the camera module 780, in response to the movement of the camera module 780 or the electronic device 701. According to an embodiment, the image stabilizer 840 may be implemented, for example, as an optical image stabilizer and may detect the movement using a gyro sensor (not illustrated) or an acceleration sensor (not illustrated) located inside or outside the camera module 780.

The memory 850 may at least temporarily store at least a part of the image obtained through the image sensor 830 for a next image processing task. For example, when image acquisition by the shutter is delayed or when a plurality of images are obtained at a high speed, the obtained original image (e.g., a high-resolution image) may be stored in the memory 850, and a copy image (e.g., a low-resolution image) corresponding to the original image may be previewed through a display device 760 of FIG. 7. Thereafter, when a specified condition (e.g., a user input or a system command) is met, at least a part of the original image stored in the memory 850 may be obtained and processed by, for example, the image signal processor 860. According to an embodiment, the memory 850 may be configured as at least a part of a memory 730 of FIG. 7 or may be configured as a separate memory operated independently of the memory 730.

The image signal processor 860 may perform image processing (e.g., depth map generation, three-dimensional (3D) modeling, panorama generation, feature point extraction, image composition, or image compensation (e.g., noise reduction, resolution adjustment, brightness adjustment, blurring, sharpening, or softening)) with respect to an image obtained through the image sensor 830 or an image stored in the memory 850. Additionally or alternatively, the image signal processor 860 may perform control (e.g., exposure time control, read-out timing control, or the like) of at least one (e.g., the image sensor 830) of the components included in the camera module 780. The image processed by the image signal processor 860 may be re-stored in the memory 850 for additional processing or may be delivered to an external component (e.g., a memory 730, a display device 760, an electronic device 702, an electronic device 704, or a server 708 of FIG. 7) of the camera module 780. According to an embodiment, the image signal processor 860 may be configured as at least a part of the processor 720, or may be configured as a separate processor which operates independently of the processor 720. When the image signal processor 860 is configured as the separate processor, the images processed by the image signal processor 860 may be displayed on the display device 760 without change or through additional image processing by the processor 720.

According to an embodiment, the electronic device 701 may include two or more camera modules 780, each of has different properties or a different function. In this case, for example, the at least one camera module 780 may be a wide-angle camera or a front camera, and the at least one other camera module(s) may be a telephoto camera or a rear camera.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 740) including an instruction stored in a machine-readable storage media (e.g., the internal memory 736 or the external memory 738) readable by a machine (e.g., a computer). The machine may be a device that calls the instruction from the machine-readable storage media and operates depending on the called instruction and may include the electronic device (e.g., the electronic device 701). When the instruction is executed by the processor (e.g., the processor 720), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

The invention claimed is:

1. An electronic device, comprising:
a first camera configured to include a first image sensor and sequentially perform an exposure and read-out in units of at least one row of a pixel array of the first image sensor;
a second camera configured to include a second image sensor and sequentially perform an exposure and read-out in units of at least one row of a pixel array of the second image sensor; and
a processor,
wherein the processor is configured to:
allow the pixel array of the first image sensor to have a difference of a first exposure start timing in units of the at least one row and obtain a first image based on a first exposure period and a first read-out speed using the first camera;
allow the pixel array of the second image sensor to have a difference of a second exposure start timing in units of the at least one row and obtain a plurality of second images based on a second exposure period including at least a portion of the first exposure period and a second read-out speed using the second camera; and
generate a third image by synthesizing at least some of the plurality of second images, and
wherein the third image has a region corresponding to the first image, the region having an exposure period approximating the first exposure period of the first image.

2. The electronic device of claim 1, wherein the third image has a difference of an exposure start timing, the difference approximating the difference of the first exposure start timing the pixel array of the first image sensor has in units of the at least one row.

3. The electronic device of claim 1, wherein the second read-out speed is faster than the first read-out speed or is equal to the first read-out speed.

4. The electronic device of claim 1, wherein the number of the plurality of obtained second images is determined based on the first exposure time and/or the second read-out speed.

5. The electronic device of claim 4, wherein the processor is configured to:
reduce the number of the plurality of obtained second images by reducing the second read-out speed;
reduce the plurality of obtained second images by increasing an exposure time of each of the plurality of second images; or
increase the plurality of obtained second images by increasing a first exposure period.

6. The electronic device of claim 1, wherein the processor is configured to:
when a length of the first period is less than a predetermined length, increase the second read-out time.

7. The electronic device of claim 1, wherein the second camera is configured to:
perform an exposure and read-out until a predetermined row of the pixel array of the second image sensor.

8. The electronic device of claim 1, wherein the processor is configured to:
generate a fourth image by synthesizing the first image and the third image.

9. The electronic device of claim 1, wherein, when a first angle of view of a lens included in the first camera is narrower than a second angle of view of a lens included in the second camera, the second exposure period of the second camera includes the first exposure period,
when a first angle of view of a lens included in the first camera is wider than a second angle of view of a lens included in the second camera, the second exposure period of the second camera is included in the first exposure period.

10. An electronic device, comprising:
a first camera configured to perform read-out at a first read-out speed;
a second camera configured to perform read-out at a second read-out speed; and
a processor,
wherein the processor is configured to:
receive a signal in which an external object is captured;
obtain a first image based on a first exposure time using the first camera, in response to the signal, the first image corresponding to a first exposure period for the external object;
obtain a plurality of second images based on a second exposure time using the second camera, the plurality of second images corresponding to a second exposure period including at least a portion of the first exposure period with respect to the external object;
divide the first image into a plurality of regions including a first region and a second region, the first region corresponding to a first period included in the first exposure period and the second region corresponding to a second period which is included in the first exposure period and is different from the first period; and
generate a third image in which the first image and at least some of the plurality of second images are synthesized, using a third region and a fourth region among some regions of the plurality of second images, the third region corresponding to the first period and corresponding to the first region and the fourth region corresponding to the second period and corresponding to the second region.

11. The electronic device of claim 10, wherein the second read-out speed is faster than the first read-out speed.

12. The electronic device of claim 10, wherein the first camera comprises a first image sensor, and
wherein the processor is configured to:
generate a third image having a difference of an exposure start timing, the difference approximating a difference of an exposure start timing a pixel array of the first image has in units of at least one row.

13. The electronic device of claim 10, further comprising:
a buffer configured to temporarily store the plurality of second images obtained from the second camera.

14. The electronic device of claim 10, wherein the processor is configured to:
generate a third image by synthesizing the first region of the first image and the third region of the plurality of second images and synthesizing the second region of the first image and the fourth region of the plurality of second images.

15. The electronic device of claim 10, wherein, when a first angle of view of a lens included in the first camera is narrower than a second angle of view of a lens included in the second camera, the second exposure period of the second camera includes the first exposure period,
when a first angle of view of a lens included in the first camera is wider than a second angle of view of a lens included in the second camera, the second exposure period of the second camera is included in the first exposure period.

* * * * *